United States Patent
Hoshino et al.

(10) Patent No.: US 9,526,094 B2
(45) Date of Patent: Dec. 20, 2016

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Masayuki Hoshino, Kanagawa (JP); Daichi Imamura, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 120 days.

(21) Appl. No.: 14/372,737

(22) PCT Filed: Jan. 11, 2013

(86) PCT No.: PCT/JP2013/000080
§ 371 (c)(1),
(2) Date: Jul. 16, 2014

(87) PCT Pub. No.: WO2013/111525
PCT Pub. Date: Aug. 1, 2013

(65) Prior Publication Data
US 2015/0003359 A1    Jan. 1, 2015

(30) Foreign Application Priority Data

Jan. 25, 2012 (JP) ................ 2012-013002
Mar. 19, 2012 (JP) ................ 2012-061977

(51) Int. Cl.
H04W 72/04 (2009.01)
H04W 24/08 (2009.01)
(Continued)

(52) U.S. Cl.
CPC ...... H04W 72/0413 (2013.01); H04L 25/0204 (2013.01); H04L 25/0224 (2013.01);
(Continued)

(58) Field of Classification Search
None
See application file for complete search history.

(56) References Cited

U.S. PATENT DOCUMENTS

2011/0305295 A1* 12/2011 Kim ............... H04L 5/0044
375/295
2012/0120891 A1* 5/2012 Mazzarese ........ H04W 72/042
370/329
(Continued)

FOREIGN PATENT DOCUMENTS

WO    2011/118141 A1    9/2011

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Ayaz Sheikh
*Assistant Examiner* — Tarell Hampton
(74) *Attorney, Agent, or Firm* — Seed IP Law Group LLP

(57) ABSTRACT

Provided is a terminal that can accurately measure channel information between the terminal and each TP subjected to CoMP control. In this terminal, a reception processing unit (203) receives a reference signal transmitted from a specific transmission point and control information, and receives a signal transmitted from a transmission point other than the specific transmission point, this signal being received in resources comprising, from among a reference-signal resource group, a resource of a first number specified from
(Continued)

the control information, and a resource of a second number separated from the first number by a predetermined number. A CSI generation unit (206) uses the reference signal and a signal received by an interference measurement resource to generate channel information. A transmission signal-forming unit (208) transmits the generated channel information.

15 Claims, 19 Drawing Sheets

(51) Int. Cl.
    *H04L 1/00*     (2006.01)
    *H04L 5/00*     (2006.01)
    *H04L 25/02*     (2006.01)
    *H04B 17/345*     (2015.01)

(52) U.S. Cl.
    CPC .......... *H04W 24/08* (2013.01); *H04B 17/345* (2015.01); *H04L 1/0003* (2013.01); *H04L 1/0026* (2013.01); *H04L 5/0035* (2013.01); *H04L 5/0048* (2013.01); *H04L 5/0073* (2013.01); *H04L 5/0092* (2013.01)

(56) References Cited

U.S. PATENT DOCUMENTS

| | | | | |
|---|---|---|---|---|
| 2012/0213261 | A1* | 8/2012 | Sayana | H04L 5/0094 375/224 |
| 2012/0257515 | A1* | 10/2012 | Hugl | H04W 24/10 370/252 |
| 2012/0320847 | A1* | 12/2012 | Nam | H04W 72/0406 370/329 |
| 2013/0010750 | A1 | 1/2013 | Hoshino et al. | |
| 2013/0010880 | A1* | 1/2013 | Koivisto | H04B 7/0469 375/259 |
| 2013/0094384 | A1* | 4/2013 | Park | H04L 1/0026 370/252 |
| 2013/0114430 | A1* | 5/2013 | Koivisto | H04B 7/024 370/252 |
| 2013/0148515 | A1* | 6/2013 | Ribeiro | H04L 5/0094 370/252 |
| 2013/0343317 | A1* | 12/2013 | Etemad | H04B 7/024 370/329 |
| 2014/0087720 | A1* | 3/2014 | Takano | H04B 7/024 455/422.1 |
| 2014/0301340 | A1* | 10/2014 | Benjebbour | H04W 24/10 370/329 |
| 2015/0049621 | A1* | 2/2015 | Liu | H04L 5/0048 370/252 |
| 2015/0078271 | A1* | 3/2015 | Kim | H04B 7/0417 370/329 |
| 2015/0358899 | A1* | 12/2015 | Ko | H04W 48/16 370/252 |

OTHER PUBLICATIONS

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol specification (Release 10)," Dec. 2011, 296 pages.

International Search Report dated Feb. 5, 2013, for corresponding International Application No. PCT/JP2013/000080, 3 pages.

LG Electronics, "Muting aspects and Intercell CSI-RS design," R1-102698, Agenda Item: 6.3.2.2, TSG-RAN WG1 Meeting #61, Montreal, Canada, May 10-14, 2010, 6 pages.

Motorola, "RE Muting for CSI-RS based Inter-cell Measurement and Signaling Support," R1-104701, Agenda Item: 6.3.2, 3GPP TSG RAN1 #62, Madrid, Spain, Aug. 23-27, 3 pages.

* cited by examiner

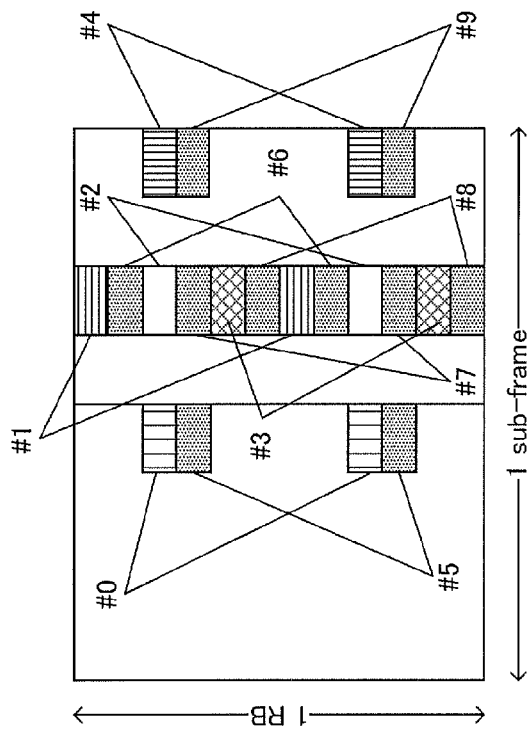
FIG. 2A (8 PORTS)
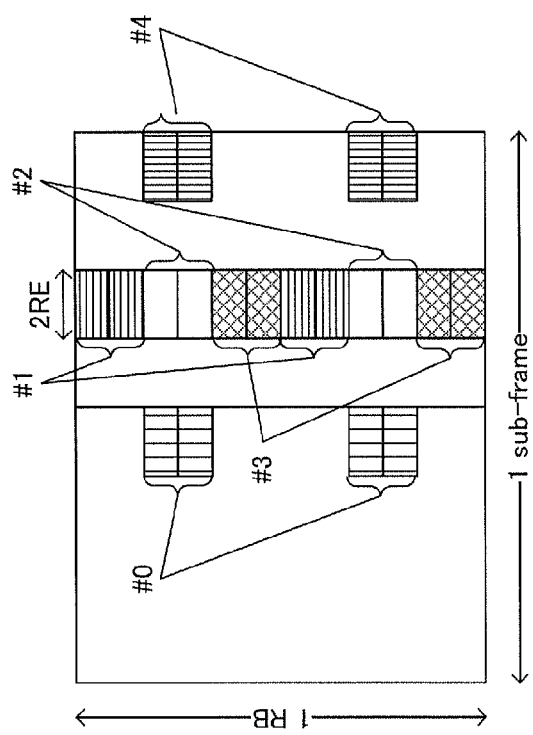
FIG. 2B (4 PORTS)
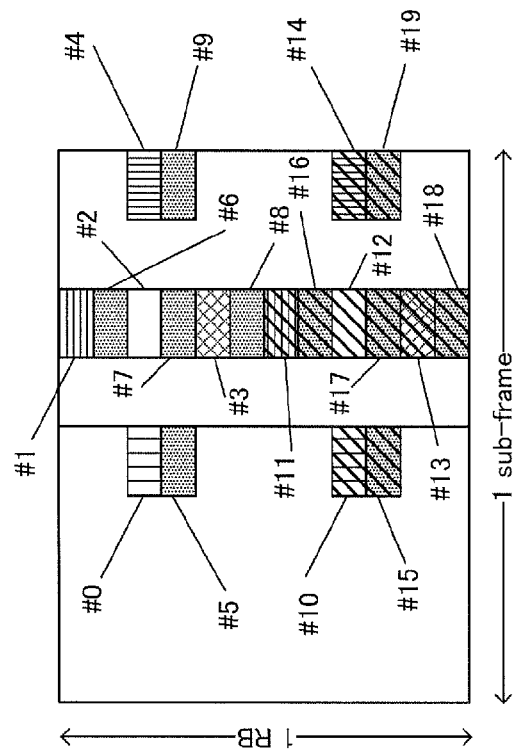
FIG. 2C (2 PORTS)

TERMINAL, BASE STATION, TRANSMISSION METHOD, AND RECEPTION METHOD

TECHNICAL FIELD

The present invention relates to a terminal, a base station, a transmission method and a reception method.

BACKGROUND ART

The 3rd Generation Partnership Project Radio Access Network Long Term Evolution (hereinafter, referred to as "LTE"), and LTE-Advanced, which is an evolved version of LTE (hereinafter, referred to as "LTE-A"), employ orthogonal frequency division multiplexing (OFDM) scheme for the downlink communication scheme.

In the OFDM scheme, studies are being carried out on employing of adaptive modulation, frequency scheduling or the like for each resource block (RB), which bundles a plurality of subcarriers, in order to improve the frequency utilization efficiency. Adaptive modulation is a technique of determining a coding rate and a modulation scheme that satisfy a predetermined packet error rate in accordance with a channel state observed on the receiving side. Frequency scheduling is a technique whereby a plurality of terminals (which may also be called UE (User Equipment)) report channel states to a base station (which may also be called cell, eNB or nodeB) for each RB using reference signals from the base station, and the base station gathers the channel states and allocates appropriate RBs to each terminal according to a predetermined scheduling algorithm (see FIG. 1).

The values used to report the channel states used in adaptive modulation, frequency scheduling or the like are called channel information (CSI). CSI includes CQI (Channel Quality Indicator). As an example of operation, a terminal calculates an index corresponding to the channel state (receiving quality in particular) as an SINR (Signal to Interference plus Noise ratio:power ratio of interference and noise to a desired signal) and reports a set of a coding rate and modulation scheme that satisfy a predetermined packet error rate as an index (e.g., CQI) on a predetermined table.

Introduction of coordinated multiple transmission point (CoMP) is under study. CoMP is a technique whereby a plurality of base stations (transmission points (TP)) cooperate with each other to transmit signals to a terminal (UE), and several schemes are under study. For example, two main CoMP schemes are under study in 3GPP: (1) CB (coordinated beamforming) scheme and (2) JT (Joint Transmission) scheme.

The CB scheme is a scheme in which only a specific TP stores data intended for a certain terminal. That is, a signal from a TP that stores no data intended for the terminal (e.g., TP adjacent to a TP to which the terminal is connected) is regarded as interference to the terminal. The CB scheme adopts a method of reducing inter-TP interference through control of transmission parameters. More specifically, examples of transmission parameters include precoding, transmission power, modulation scheme and coding rate. Appropriately controlling these transmission parameters makes it possible to weaken signals from an interference TP (TP that possesses no data intended for the terminal) for the terminal while strengthening signals from a desired TP (TP that possesses data intended for the terminal). Strengthening signals from a desired TP and weakening signals from an interference TP may contradict each other depending on the circumstances, but various proposals are being made taking into account the trade-off between the two.

On the other hand, the JT scheme is a scheme in which data to a certain terminal is shared by a plurality of TPs. Thus, a plurality of TPs can simultaneously transmit signals intended for the terminal. For this reason, since the terminal can handle signals from other TPs not as interference signals but as desired signals, an SINR observed at the terminal can be expected to improve. Furthermore, improving a method of generating precoding weights at a plurality of TPs as an operation within a network allows for an even greater performance improvement.

For such CoMP control, there is a method of observing channel information between CoMP control target TPs and a terminal and reporting the channel information to the network as channel information in units of TPs.

As reference signals used to measure or report CSI during CoMP control, there is a CSI-RS (Channel State Information Reference Signal: reference signal for measurement of channel information). FIGS. 2A to 2C illustrate configuration examples of CSI-RS with respective numbers of transmitting antenna ports. As shown in FIGS. 2A to 2C, CSI-RSs are defined by a configuration corresponding to the number of transmitting antenna ports (8 ports, 4 ports or 2 ports) of the base station. In FIGS. 2A to 2C, one RB consists of 12 subcarriers and each block shown in FIGS. 2A to 2C represents resources of two OFDM symbols in each subcarrier that are continuous in the time domain (2 REs (Resource Elements)). In each block (2 REs) shown in FIGS. 2A to 2C, CSI-RSs corresponding to two ports are code-multiplexed.

Each terminal acquires information relating to CSI-RS from the base station beforehand. More specifically, the information relating to CSI-RS includes, for example, the number of antenna ports (antennaPortsCount), subcarriers within a subframe, and CSI-RS configuration number that identifies an OFDM symbol position (resourceConfig, hereinafter may be represented by "CSI-RS config(i)" or "#i," CSI-RS configs (0) to (19) in FIGS. 2A to 2C), transmission subframe configured of a transmission period and an offset (subframeConfig), and a power ratio (p-C) between reference signals and data signals (see NPLs 1 and 2).

In FIGS. 2A to 2C, CSI-RS configuration numbers are assigned in order in the time direction and in order in the frequency direction at the same point of time. Moreover, as shown in FIGS. 2A to 2C, the same number is assigned to resource starting positions of the respective CSI-RS configuration numbers (starting positions in order of number assignment) between CSI-RS configurations corresponding to the respective numbers of antenna ports. As shown in FIGS. 2A to 2C, a CSI-RS configuration used when the number of antenna ports is small constitutes a subset of a CSI-RS configuration used when the number of antenna ports is large (may also be called "(nested structure")). It is thereby made possible to identify the resources for each of the number of antenna ports with minimum numbers while using an overlapping number in the CSI-RS configuration corresponding to each of the numbers of antenna ports. For example, CSI-RS config(0) with two ports shown in FIG. 2C can be identified as only resources corresponding to two ports (2 REs) from the starting position of CSI-RS config(0) with eight ports (8 REs) shown in FIG. 2A.

Note that a procedure for a base station to indicate, to a terminal, information relating to CSI-RS of each TP beforehand is adopted to observe channel information between CoMP control target TPs (hereinafter represented by "coordinating TP" or may also be called "CoMP measurement set") and a terminal.

There is also a muting technique that makes data of the TP to which the terminal is connected a non-transmission signal in order for the terminal to observe reference signals (CSI-RSs) transmitted from peripheral TPs among coordinating TPs (CoMP measurement set). More specifically, each of CSI-RS configs (0) to (9) (see FIG. 2B) which are 4-port CSI-RS configuration numbers of the aforementioned CSI-RS configuration numbers is expressed in a bitmap, and the base station indicates, to the terminal, which resource is designated as a non-transmission signal resource. The information on the bitmap type indicating which resource is designated as a non-transmission signal resource is called "non-transmission CSI-RS configuration number list" (zeroTxPowerResourceConfigList) (see NPL 2).

For example, when resources of CSI-RS configs (1) and (2) of CSI-RS configs (0) to (9) are designated as non-transmission signal resources, the non-transmission CSI-RS configuration number list becomes {0, 1, 1, 0, 0, 0, 0, 0, 0, 0}. In the list, "1" represents a non-transmission signal resource and "0" represents a resource other than a non-transmission signal resource in correspondence with CSI-RS configs (0) to (9) respectively in order from the leading bit of the non-transmission CSI-RS configuration number list.

The base station indicates, to the terminal, a transmission subframe as well (zeroTxPowerSubframeConfig) configured of a transmission period and an offset like the aforementioned CSI-RS as a subframe in which a non-transmission signal resource is configured. This allows the terminal to identify which resource in which subframe becomes a non-transmission signal resource.

FIG. 3 illustrates positions of non-transmission signal resources (CSI-RS configs (1) and (2)) within a subframe corresponding to zeroTxPowerSubframeConfig configured in a TP to which a certain terminal is connected. In this case, by causing the CSI-RS configuration of a TP positioned in the periphery of the TP to associate with any one of non-transmission signal resources (CSI-RS config(1) or (2) in FIG. 3), the terminal no longer receives interference from data from the TP to which the terminal is connected and can secure CSI measuring accuracy when observing CSI-RSs of the peripheral TP as desired signals.

CITATION LIST

Non-Patent Literature

NPL 1
3GPP TS 36.211 v10.4.0, Section 6.10.5, "3GPP TSG RAN E-UTRA Physical Channels and Modulation (Release 10)"
NPL 2
3GPP TS 36.331 v10.4.0, Section 6.3.2, "3GPP TSG RAN E-UTRA Radio Resource Control (RRC); Protocol specification (Release 10)"

SUMMARY OF INVENTION

Technical Problem

Studies are being carried out on calculating interference components (noise components) using predetermined resources (hereinafter referred to as "interference estimation resources" (interference measurement) resources), in addition to calculating desired signal components using reference signals when measuring an SINR as the aforementioned CSI (e.g., CQI). The terminal can measure signal components received through these interference estimation resources, that is, signal components arriving at the terminal from a TP other than a TP that transmits a desired signal, as interference components. Thus, measuring channel information (CSI) between CoMP control target TPs and a terminal with high accuracy requires that not only desired signal components be accurately estimated using CSI-RS for each TP but also interference components be accurately estimated for each TP using interference estimation resources.

An object of the present invention is to provide a terminal, a base station, a transmission method and a reception method that make it possible to accurately measure channel information between CoMP control target TPs and a terminal.

Solution to Problem

A terminal according to an aspect of the present invention includes: a receiving section that receives a reference signal transmitted from a specific transmission point and control information, and that receives a signal transmitted from a transmission point other than the specific transmission point using resources including a resource of a first number and a resource of a second number, the first number being identified by the control information from among a reference signal resource group, the second number being distanced from the first number by a predetermined number; a generating section that generates channel information using the reference signal and the signal; and a transmitting section that transmits the generated channel information.

A base station according to an aspect of the present invention includes: a configuration section that configures a resource of a first number from among a reference signal resource group; a transmitting section that transmits control information including the first number to a terminal; and a receiving section that receives channel information generated using a signal transmitted from a transmission point other than a specific transmission point and a reference signal transmitted from the specific transmission point, the signal from the transmission point other than the specific transmission point being transmitted using resources including the resource of the first number identified by the control information in the terminal and a resource of a second number distanced from the first number by a predetermined number.

A transmission method according to an aspect of the present invention includes: receiving a reference signal transmitted from a specific transmission point and control information, and receiving a signal transmitted from a transmission point other than the specific transmission point using resources including a resource of a first number and a resource of a second number, the first number being identified by the control information from among a reference signal resource group, the second number being distanced from the first number by a predetermined number; generating channel information using the reference signal and the signal; and transmitting the generated channel information.

A reception method according to an aspect of the present invention includes: configuring a resource of a first number from among a reference signal resource group; transmitting control information including the first number to a terminal; and receiving channel information generated using a signal transmitted from a transmission point other than a specific transmission point and a reference signal transmitted from the specific transmission point, the signal from the transmission point other than the specific transmission point being transmitted using resources including the resource of the first number identified by the control information in the terminal and a resource of a second number distanced from the first number by a predetermined number.

Advantageous Effects of Invention

According to the present invention, it is made possible to accurately measure channel information between CoMP control target TPs and a terminal.

BRIEF DESCRIPTION OF DRAWINGS

FIGS. 2A to 2C illustrate a CSI-RS configuration.

DESCRIPTION OF EMBODIMENTS

Figure 1:
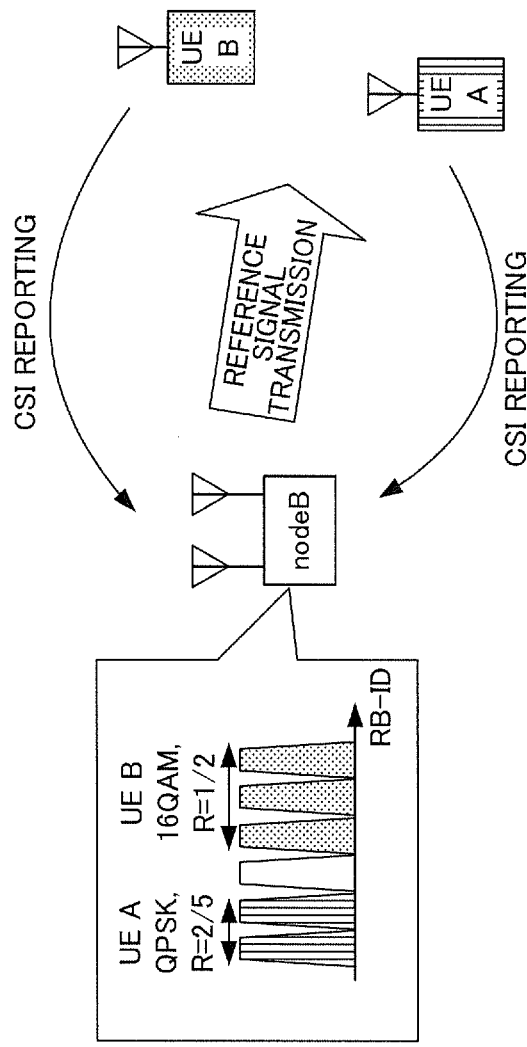
FIG. 1 illustrates adaptive modulation and frequency scheduling based on CSI reporting.

Hereinafter, embodiments of the present invention will be described in detail with reference to the drawings. Throughout the embodiments, the same elements are assigned the same reference numerals and any duplicate description of the elements is omitted.

Embodiment 1

Overview of Communication System

A communication system according to Embodiment 1 of the present invention includes base station 100 and terminals 200. Base station 100 is an LTE-A compliant base station and terminals 200 are LTE-A compliant terminals.

Figure 4:
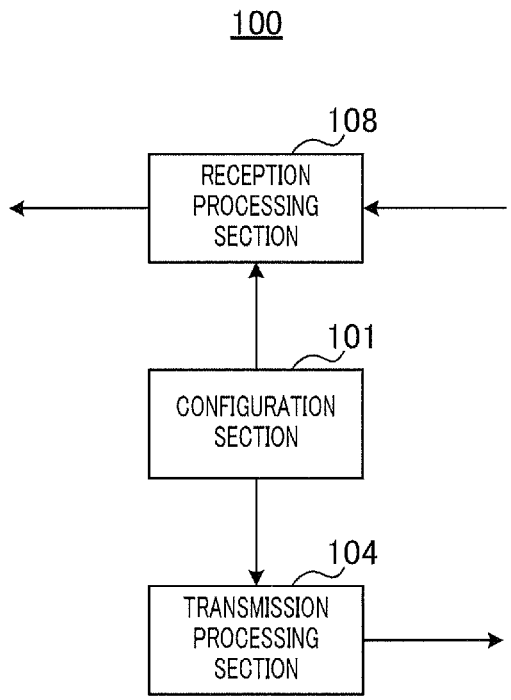
FIG. 4 is a block diagram illustrating a main configuration of a base station according to Embodiment 1 of the present invention.

FIG. 4 is a main configuration diagram of base station 100 according to Embodiment 1 of the present invention. In base station 100, configuration section 101 configures resources (interference estimation resources) from a reference signal resource group (CSI-RS configuration), transmission processing section 104 transmits control information including the above-described resources to terminal 200, and reception processing section 108 receives channel information (CSI) generated using signals transmitted from TPs other than a specific TP and a reference signal (CSI-RS) transmitted from the specific TP using resources identified from the control information in terminal 200.

Figure 5:
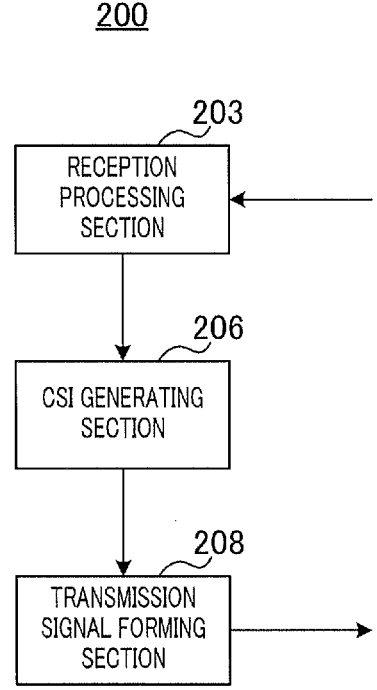
FIG. 5 is a block diagram illustrating a main configuration of a terminal according to Embodiment 1 of the present invention.

FIG. 5 is a main configuration diagram of terminal 200 according to Embodiment 1 of the present invention. In terminal 200, reception processing section 203 receives reference signals (CSI-RSs) transmitted from a specific TP and control information, receives signals transmitted from TPs other than the above-described specific TP using resources identified from the control information out of a reference signal resource group (CSI-RS configuration), CSI generating section 206 generates channel information (CSI) using the reference signals and the above-described signals and transmission signal forming section 208 transmits the generated channel information.

In the present embodiment, as interference estimation resources, non-transmission signal resources for measuring CSI-RS from other TPs are used without modification.

Hereinafter, a description will be given under the assumption that an FDD (Frequency Division Duplex) system in which uplink and downlink are frequency-divided is used. However, a configuration may also be adopted where terminal 200 reports channel information to base station 100 in a TDD (Time Division Duplex) system in which uplink and downlink are time-divided, without being limited to the FDD system.

Hereinafter, a description will be given with an exemplary configuration where single base station 100 forms two TPs. However, without being limited to this configuration, a configuration may also be adopted in which a plurality of base stations 100 respectively forms TPs and signals are shared appropriately such that both base stations are operated in coordination.

[Configuration of Base Station 100]

Figure 6:
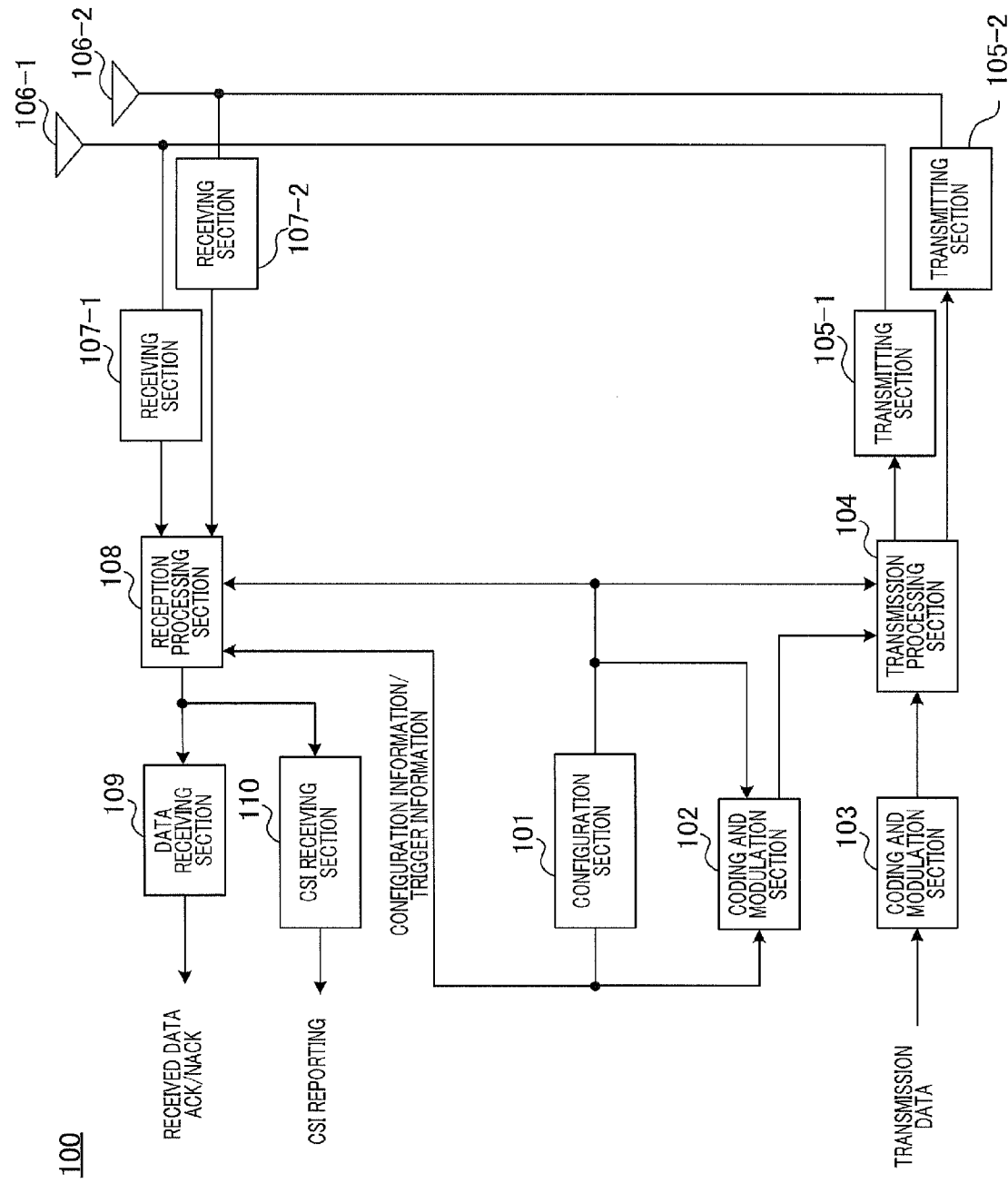
FIG. 6 is a block diagram illustrating a configuration of the base station according to Embodiment 1 of the present invention.

FIG. 6 is a block diagram illustrating a configuration of base station 100 according to Embodiment 1 of the present invention. In FIG. 6, base station 100 includes configuration section 101, coding and modulation sections 102 and 103, transmission processing section 104, transmitting sections 105-1 and 105-2, antennas 106-1 and 106-2, receiving sections 107-1 and 107-2, reception processing section 108, data receiving section 109, and CSI receiving section 110.

Configuration section 101 generates "TP information" as control information indicating to CSI reporting target terminal 200 a plurality of transmission points (TPs) that can be connection destination candidates for CSI reporting target terminal 200 may be connected. The TP information includes CSI-RS parameters of each TP and parameters of non-transmission signal resources of each TP as information relating to transmission points (that is, coordinating TPs) that become connection destination candidates. The CSI-RS parameters are, for example, the number of antenna ports, CSI-RS configuration number (e.g., see FIG. 2) that identifies positions of subcarriers in a subframe and OFDM symbols (positions of resources), subframe made up of a transmission period and an offset, and a power ratio between reference signals and data signals. Parameters of non-transmission signal resources are, for example, a subframe made up of a transmission period and an offset, non-transmission signal CSI-RS configuration number list which is a bitmap notation of CSI-RS configuration numbers. That is, configuration section 101 configures parameters necessary to measure channel information (CSI) using signals from respective TPs for CSI reporting target terminal 200.

As described above, the TP information generated by configuration section 101 is subjected to transmission processing as configuration information in coding and modulation section 102, transmission processing section 104, and transmitting section 105 and then transmitted to CSI reporting target terminal 200. Furthermore, configuration section 101 transmits the TP information to CSI reporting target terminal 200 via coding and modulation section 102 and also outputs the TP information to reception processing section 108.

Configuration section 101 instructs terminal 200 to report downlink channel information (hereinafter described as downlink CSI report or may also be called "downlink CSI feedback)" to each TP. This reporting (i.e. request for reporting downlink CSI) is indicated as higher layer information. This downlink CSI reporting can also be performed at a periodic timing or at an optional timing (aperiodically) based on trigger information. It should be noted that the trigger information is included in a downlink control channel (PDCCH: Physical Downlink Control Channel), for example. CSI reporting performed at a periodic timing is included in an uplink control channel (PUCCH: Physical Uplink Control Channel) separately configured in the CSI reporting target terminal. Moreover, configuration section 101 indicates, to terminal 200, as to whether or not to perform operation corresponding to simultaneous transmission of PUCCH and uplink data channel PUSCH (Physical Uplink Shared Channel).

Configuration section 101 generates assignment control information including resources (RB) allocation information and MCS (Modulation and Coding Scheme) information for one or a plurality of transport blocks (TBs). The assignment control information includes assignment control information relating to uplink resources (e.g., PUSCH) to which uplink data is assigned and assignment control information relating to downlink resources (e.g., PDCCH (Physical Downlink Shared Channel)) to which downlink data is assigned. The assignment control information is outputted to transmission processing section 104 and reception processing section 108 and also indicated by base station 100 to terminal 200 using a PDCCH.

Coding and modulation section 102 encodes and modulates configuration information (including TP information), trigger information and assignment control information received from configuration section 101 and outputs the modulated signal obtained to transmission processing section 104.

Coding and modulation section 103 encodes and modulates an inputted data signal (transmission data) and outputs the modulated signal obtained to transmission processing section 104.

Transmission processing section 104 forms transmission signals by mapping the modulated signals to be received from coding and modulation sections 102 and 103 to the resources indicated by the downlink resource allocation information received from configuration section 101. In a case where the transmission signals are OFDM signals, OFDM signals are formed by mapping the modulated signals to the resources indicated by the downlink resource allocation information to be received from configuration section 101, transforming the mapped signals into a time waveform by inverse fast Fourier transform (IFFT), and adding cyclic prefix (CP) to the resultant signals.

Transmitting section 105-1 or 105-2 performs radio transmission processing (e.g., up-conversion, digital to analog (D/A) conversion, and/or the like) on the transmission signals received from transmission processing section 104 and transmits the resultant signals via antenna 106-1 or 106-2.

Receiving sections 107-1 and 107-2 perform radio reception processing (e.g., down-conversion, analog to digital (A/D) conversion, and/or the like) on the radio signals received via antenna 106-1 or 106-2 and outputs the obtained received signals to reception processing section 108.

In addition, in a plurality of transmission and reception sections and antennas, for example, transmitting section 105-1, receiving section 107-1, and antenna 106-1 may be used to form TP #1, and transmitting section 105-2, receiving section 107-2, and antenna 106-2 may be used to form TP #2.

Reception processing section 108 identifies the resources to which the uplink data signal and ACK/NACK information are mapped, on the basis of the uplink resource allocation information received from configuration section 101 and extracts a signal component mapped to the identified resources from the received signal.

Reception processing section 108 identifies resources to which CSI reports are mapped based on the configuration information including TP information and trigger information received from configuration section 101, and extracts signal components mapped to the identified resources from the received signal. More specifically, for periodic CSI reporting, reception processing section 108 identifies the above-described PUCCH resources as CSI reporting resources when there is no uplink data assignment in defined subframes or for an operation corresponding to simultaneous transmission of PUCCH and PUSCH even when there is uplink data assignment. For an operation not supporting simultaneous transmission of PUCCH and PUSCH even when there is uplink data assignment, reception processing section 108 identifies the above-described PUSCH resources as CSI report resources. Reception processing section 108 receives the CSI reports using the identified resources. On the other hand, for aperiodic CSI reporting, reception processing section 108 receives the CSI reports using the identified resources in the fourth subframe from the subframe in which trigger information is transmitted.

In a case where the received signal is spatially multiplexed signal (i.e., multi-codeword (CW) transmission), reception processing section 108 demultiplexes the signal for each CW. In addition, in a case where the received signal is OFDM signal, reception processing section 108 performs an inverse discrete Fourier transform (IDFT) on the extracted signal component to transform the OFDM signal into time-domain signal.

The uplink data signal (received data) and ACK/NACK information extracted by reception processing section 108 as described above are outputted to data receiving section 109 while the CSI is outputted to CSI receiving section 110.

Data receiving section 109 decodes the signal received from reception processing section 108. The uplink data and ACK/NACK information are thus obtained.

CSI receiving section 110 demodulates the signal received from reception processing section 108. The CSI is thus obtained. Base station 100 performs scheduling and link adaptation and CoMP control based on the CSI of each received transmission point.

[Configuration of Terminal 200]

Figure 7:
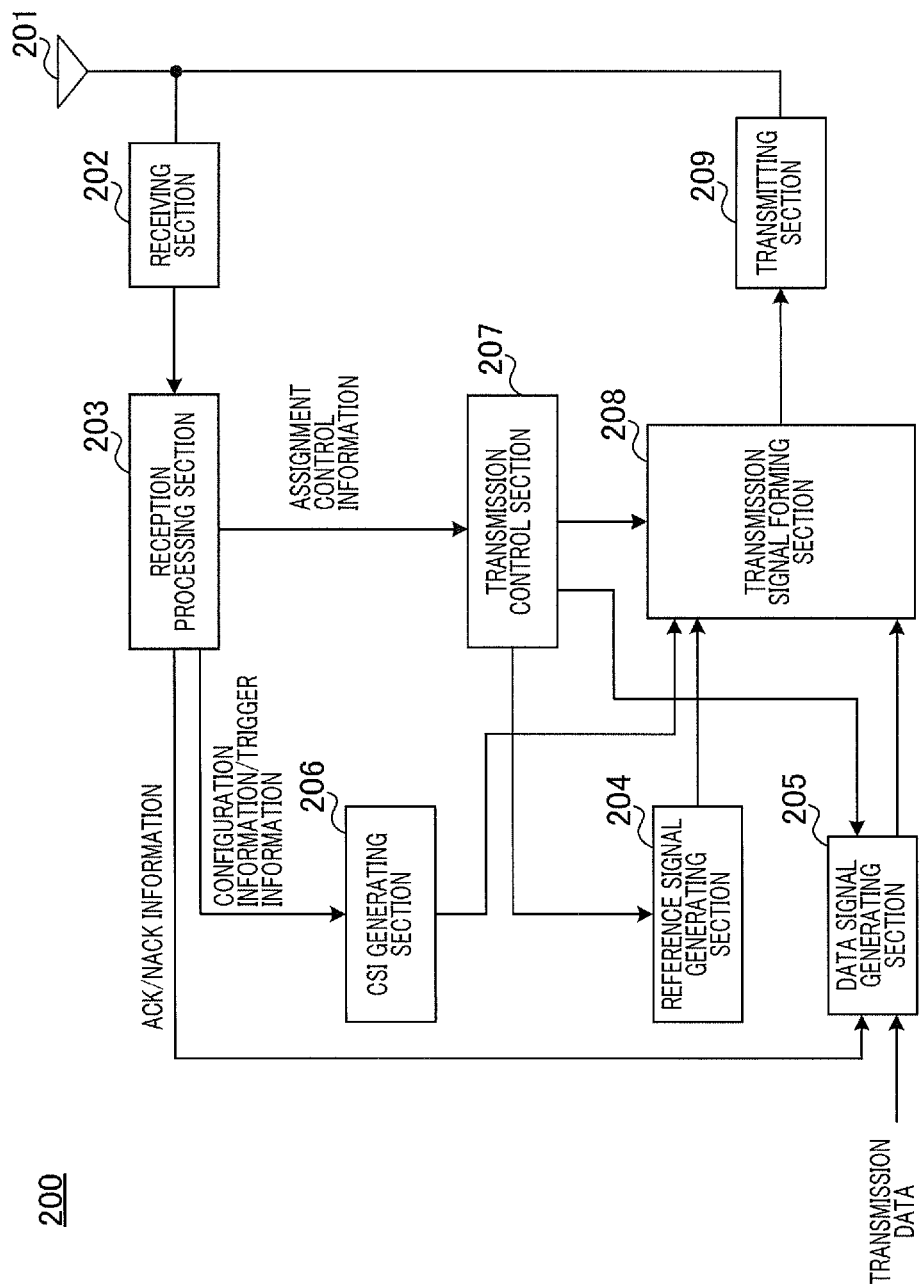
FIG. 7 is a block diagram illustrating a configuration of the terminal according to Embodiment 1 of the present invention.

FIG. 7 is a block diagram illustrating the configuration of terminal 200 according to Embodiment 1 of the present invention. Terminal 200 herein is an LTE-A compliant terminal.

In FIG. 7, terminal 200 includes antenna 201, receiving section 202, reception processing section 203, reference signal generating section 204, data signal generating section 205, CSI generating section 206, transmission control section 207, transmission signal forming section 208 and transmitting section 209.

Receiving section 202 performs radio reception processing (e.g., down-conversion, analog to digital (A/D) conversion, and/or the like) on the radio signal received via antenna 201 and outputs the obtained received signal to reception processing section 203.

Reception processing section 203 extracts the configuration information (TP information), assignment control information, trigger information, and data signal included in the received signal. Reception processing section 203 outputs the assignment control information to transmission control section 207 and outputs the configuration information and trigger information to CSI generating section 206. Moreover, reception processing section 203 performs error detection processing on the extracted data signal and outputs ACK/NACK information in accordance with the result of error detection to data signal generating section 205.

Reception processing section 203 extracts a reference signal (e.g., CSI-RS) from the received signal based on the TP information in the configuration information and outputs the reference signal (received value) to CSI generating section 206. Furthermore, reception processing section 203 extracts signal components of resources configured in a non-transmission signal of each TP based on parameters of non-transmission signal resources indicated in TP information and outputs the extracted signal component to CSI generating section 206. CSI generating section 206 uses CSI-RS from each TP as a desired signal and uses signal components received by interference estimation resources as interference and noise. That is, terminal 200 uses parameters of non-transmission signal resources as parameters of interference estimation resources.

Upon receipt of an instruction to generate a reference signal (e.g., sounding reference signal (SRS)) from transmission controlling section 207, reference signal generating section 204 generates and outputs a reference signal (SRS) to transmission signal forming section 208.

Data signal generating section 205 receives the ACK/NACK information and transmission data and generates data signal by encoding and modulating the ACK/NACK information and transmission data on the basis of MCS information received from transmission controlling section 207. For non-MIMO transmission, data signal is generated using a single codeword (CW) while data signal is generated using two code words for MIMO transmission. It should be noted that data signal generating section 205 also performs CP removal processing and FFT processing when the received signal is OFDM signal.

CSI generating section 206 generates CSI (channel information) based on TP information and trigger information. More specifically, CSI generating section 206 generates CSI (e.g., SINR) using CSI-RS (desired signal) from each TP and signal components (interference and noise) received by the above-described interference estimation resources. When periodic CSI reporting is configured, CSI generating section 206 generates CSI through CSI measurement using CSI-RSs from all TPs included in the TP information at timing of CSI reporting of all TPs included in the TP information. On the other hand, when aperiodic CSI reporting is configured, upon receipt of trigger information corresponding to CSI reporting of all TPs included in the TP information, CSI generating section 206 generates CSI through CSI measurement using CSI-RSs from all TPs included in the TP information.

Transmission controlling section 207 identifies "data mapping resources," to which data signal is mapped, on the basis of the assignment control information to be received from reception processing section 203. Transmission controlling section 207 outputs information about the data mapping resources (hereinafter, may be referred to as "data mapping resource information") to transmission signal forming section 208 and also outputs MCS information included in the assignment control information to data signal generating section 205.

Transmission signal forming section 208 maps the reference signal received from reference signal generating section 204 to the reference signal mapping resources. Transmission signal forming section 208 maps the data signals received from data signal generating section 205 to the data mapping resources indicated by the data mapping resource information. Transmission signal forming section 208 maps the CSI reporting received from CSI generating section 206 to the CSI reporting mapping resources. The transmission signal is generated in the manner described above. It should be noted that, for Non-MIMO transmission, single codeword data signal is assigned to a single layer while two codeword data signal is assigned to a plurality of layers for MIMO transmissions. Meanwhile, when the transmission signal is an OFDM signal, transmission signal forming section 208 performs a discrete Fourier transform (DFT) on the data signal and maps the resultant data signal to the data mapping resources. Furthermore, CP is added to the transmission signals thus formed.

Transmitting section 209 performs radio transmission processing (e.g., up-conversion, digital to analog (D/A) conversion, and/or the like) on the transmission signal formed by transmission signal forming section 208 and thereafter transmits the processed signal via antenna 201.

(Operations of Base Station 100 and Terminal 200)

A description will be provided regarding operations of base station 100 and terminal 200 respectively including the abovementioned configurations.

Figure 3:
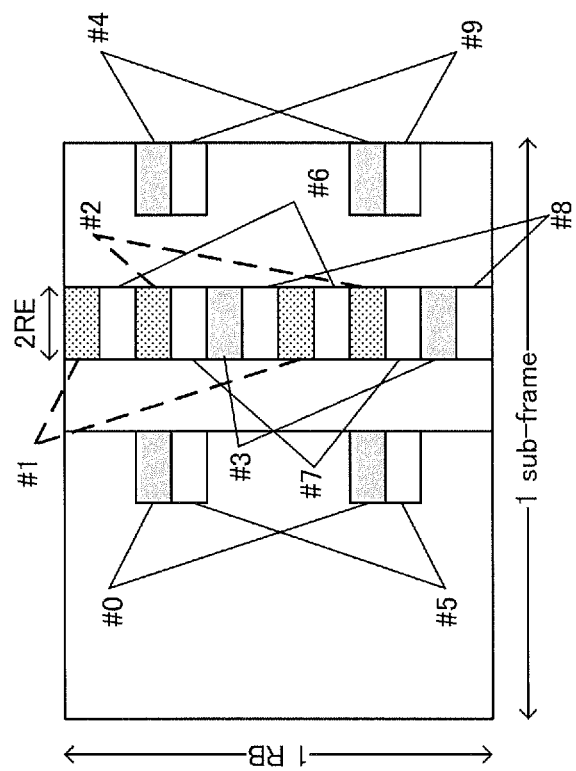
FIG. 3 illustrates a configuration example of non-transmission signal resources.

In base station 100, configuration section 101 configures parameters of non-transmission signal resources corresponding to FIG. 3 in configuration target terminal 200. As described above, non-transmission signal resources are selected from CSI-RS configs (0) to (9), which are 4-port CSI-RS configuration numbers. That is, in FIG. 3, configuration section 101 configures CSI-RS config(1) and CSI-RS config(2) in terminal 200 as non-transmission signal resources. Next, configuration section 101 generates a non-transmission CSI-RS configuration number list (zeroTx-PowerResourceConfigList) indicating that non-transmission signal resources are CSI-RS config(1) and CSI-RS config (2). The non-transmission CSI-RS configuration number list is information in bitmap notation corresponding to ten resources of CSI-RS config(0) to (9). That is, in FIG. 3, the non-transmission CSI-RS configuration number list is expressed by {0, 1, 1, 0, 0, 0, 0, 0, 0, 0}. Here, "1" represents a non-transmission signal resource and "0" represents a resource other than a non-transmission signal resource in correspondence with CSI-RS configs (0) to (9) in order from the leading bit of the non-transmission CSI-RS configuration number list.

Base station 100 indicates, to configuration target terminal 200, configuration information including the non-transmission CSI-RS configuration number list configured by configuration section 101.

In terminal 200, reception processing section 203 identifies CSI-RS resources from a TP to which terminal 200 is connected based on parameters of CSI-RS included in TP information indicated from base station 100 and extracts the CSI-RS from the TP. Reception processing section 203 extracts signal components in resources (CSI-RS config(1) and CSI-RS config(2) in FIG. 3) shown in the non-transmission CSI-RS configuration number list included in the TP information.

In FIG. 3, the TP to which terminal 200 is connected transmits no signal using non-transmission signal resources (CSI-RS config(1) and CSI-RS config(2)) configured in the TP to which terminal 200 is connected. Thus, signal components extracted by reception processing section 203 using non-transmission signal resources are signal components from peripheral TPs other than the TP to which terminal 200 is connected. That is, signal components extracted by reception processing section 203 using non-transmission signal resources are interference components (noise components) for the TP to which terminal 200 is connected.

CSI generating section 206 measures CSI for the TP assuming CSI-RS from the TP as a desired signal and signal components extracted using non-transmission signal resources as interference components (noise components) about the TP to which terminal 200 is connected.

Thus, terminal 200 uses non-transmission signal resources configured so that the TP to which terminal 200 is connected does not provide interference to CSI-RS transmitted from peripheral TPs other than the TP to which terminal 200 is originally connected as interference estimation resources for the TP to which terminal 200 is connected, without modification. This allows terminal 200 to distinguish desired signal components (CSI-RSs) from interference/noise signal components among coordinating TPs (CoMP measurement set) and accurately perform estimation.

Therefore, according to the present embodiment, terminal 200 can measure CSI between CoMP control target TPs and the terminal with high accuracy and base station 100 can appropriately execute adaptive modulation and frequency scheduling or the like using CSI reported from terminal 200.

Embodiment 2

A case has been described in Embodiment 1 where parameters indicating non-transmission signal resources of a TP (non-transmission CSI-RS configuration number list) are used as interference estimation resources of the TP without modification.

However, the terminal has not acquired information relating to CSI-RS of TPs not coordinating with the TP to which the terminal is connected. Thus, the terminal cannot identify whether or not the non-coordinating TPs are transmitting CSI-RSs using the indicated non-transmission signal resources (interference estimation resources). That is, the terminal cannot determine whether non-transmission signal resources configured in the TP to which the terminal is connected and CSI-RS resources configured in the non-coordinating TPs overlap (collide) with each other.

Here, in interference estimation, the terminal is intended to observe signal components arriving from TPs other than a target TP (CSI measurement target) and estimate the observed signal components as the amount of interference to data transmitted from the target TP. That is, the terminal preferably obtains the amount of interference estimated in data regions of other TPs. Reference signals (CSI-RSs) may be transmitted throughout the entire band from each antenna port of the TP without depending on the amount of data transmitted from, for example, the corresponding TP or without applying precoding used for data transmission. Therefore, the result of estimation of the amount of interference estimated by the terminal may differ when the non-coordinating TP transmits reference signals and when it transmits data signals. More specifically, when the non-coordinating TP transmits reference signals, compared to when the non-coordinating TP transmits data signals, the terminal may excessively estimate the amount of interference.

For this reason, in subframes in which no CSI-RS is transmitted from the non-coordinating TP, the terminal can appropriately estimate interference components (signal components of the data region of each TP) to the coordinating TP. In contrast, in subframes in which CSI-RS is transmitted from the non-coordinating TP, the terminal may excessively estimate interference components for the coordinating TP. That is, when not only the TPs coordinating with the TP to which the terminal is connected but also the non-coordinating TP is taken into consideration, there may be a variation in the result of estimation of interference components estimated in the terminal.

Figure 8:
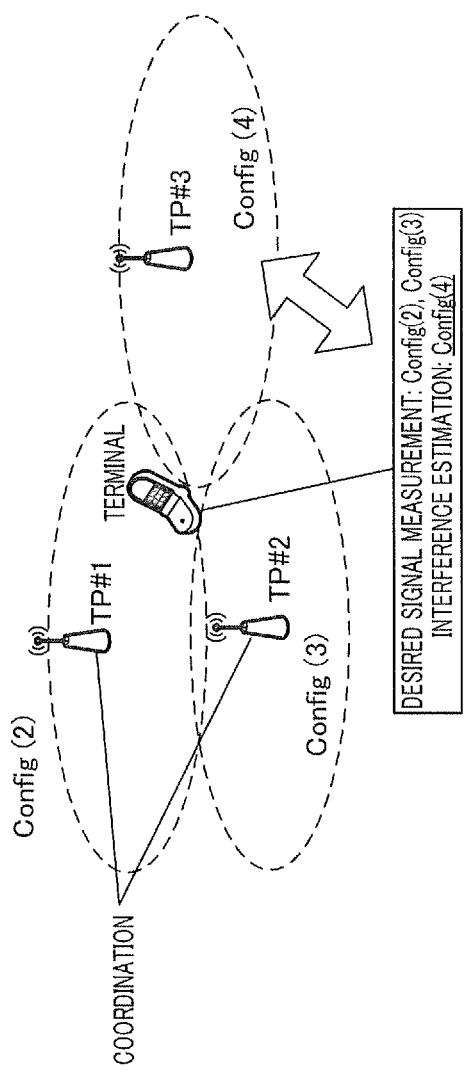
FIG. 8 is a diagram provided for describing collision with a non-coordinating TP according to Embodiment 2 of the present invention.

For example, as shown in FIG. 8, a case will be described where a terminal is located in a CoMP measurement set in which TP#1 and TP#2 are coordinating with each other but TP#3 is not coordinating with TP#1 and #2. In FIG. 8, CSI-RS config(2) is configured in TP#1 as a CSI-RS resource, CSI-RS config(3) is configured in TP#2 and CSI-RS config(4) is configured in TP#3. CSI-RS config(4) is also configured as an interference estimation resource for a CSI measurement target TP (e.g., TP#1). In this case, CSI-RS config(2) and CSI-RS config(3) are indicated to the terminal as CSI-RS resources of coordinating TP#1 and #2 and CSI-RS config(4) is indicated as an interference estimation resource.

In the case of FIG. 8, in subframes in which interference estimation resources are configured, of TP#1 and #2 (coordinating TPs), TP#1 (CSI measurement target) transmits no signal using resources corresponding to CSI-RS config(4), whereas TP#2 transmits data signals using resources corresponding to CSI-RS config(4). On the other hand, TP#3 transmits CSI-RS using resources corresponding to CSI-RS config(4) at transmission timing of CSI-RS and transmits no CSI-RS using resources corresponding to CSI-RS config(4) at any timing other than transmission timing of CSI-RS. Thus, the terminal may receive signals in which data signals from TP#2 and CSI-RS from TP#3 are mixed using resources corresponding to CSI-RS config(4) or receive only data signals from TP#2, and the result of estimation of interference components obtained based on the received signals may vary.

On the other hand, as a possible method of preventing a variation in the result of estimation of the interference components, a sufficient amount of CSI-RS resources may be configured as non-transmission signal resources and measured values of interference components may be averaged. However, in subframes in which non-transmission signal resources are configured, this method causes the amount of resources configured as non-transmission signal resources to increase and causes the amount of resources that should originally be used for data transmission to decrease, which may lead to deterioration of system throughput.

In the present embodiment, a method of indicating interference estimation resources will be described which can measure CSI with high accuracy while preventing deterioration of system throughput in consideration of TPs not coordinating with a TP to which the terminal is connected.

Since the base station and terminal according to the present embodiment have basic configurations common to those of base station 100 and terminal 200 according to Embodiment 1, the configurations will be described with reference to FIGS. 6 and 7.

In base station 100, configuration section 101 generates interference estimation resource information for CSI reporting target terminal 200 in addition to the operation of Embodiment 1. Like parameters of CSI-RS of each TP, the interference estimation resource information includes transmission subframes configured of a CSI-RS configuration number (CSI-RS config(i)), a transmission period and an offset.

The interference estimation resource information is indicated from base station 100 to terminal 200 beforehand and shared between base station 100 and terminal 200. Note that the configuration information including the interference estimation resource information is indicated from base station 100 to terminal 200 through, for example, RRC signaling. Base station 100 may also indicate configuration information included in a CSI-RS-Config message. Base station 100 may also configure one of periodic CSI reporting and aperiodic CSI reporting in CSI reporting target terminal 200 and indicate the configured information included in a CQI-Report Config message.

On the other hand, in terminal 200, reception processing section 203 extracts TP information, interference estimation resource information, assignment control information, trigger information, and data signals. Reception processing section 203 extracts reference signals (e.g., CSI-RSs) from received signals based on CSI-RS parameters of each TP indicated in TP information and outputs the reference signals (received values) to CSI generating section 206 as in the case of Embodiment 1.

Reception processing section 203 identifies interference estimation resources using interference estimation resource information. More specifically, reception processing section 203 identifies interference estimation resources configured using resources corresponding to a CSI-RS configuration number (e.g., CSI-RS config(i)) indicated in the interference estimation resource information of the CSI-RS configuration (CSI-RS resource group), and resources corresponding to a CSI-RS configuration number distanced by a predetermined number from the CSI-RS configuration number (CSI-RS config(i)) indicated in the interference estimation resource information. Reception processing section 203 extracts signal components in the identified interference estimation resources and outputs the extracted signal components to CSI generating section 206.

Note that each TP does not transmit any data signal using interference estimation resources configured in the TP. Thus, the signal components received using the identified interference estimation resources are signals transmitted from peripheral TPs other than the above-described TP (interference/noise components corresponding to the above-described TP).

CSI generating section 206 generates CSI using CSI-RS as desired signals, and signal components of interference estimation resources as interference/noise components. For example, when periodic CSI reporting is configured, CSI generating section 206 generates CSI of each TP at the configured CSI report timing. When aperiodic CSI reporting is configured, CSI generating section 206 generates CSI of each TP at timing of triggering of CSI reporting. The generated CSI is transmitted to base station 100 via transmission signal forming section 208 and transmitting section 209.

Next, configuration examples of interference estimation resources will be described. Here, the 4-port CSI-RS configuration shown in FIG. 2B will be described as an example.

Base station 100 (configuration section 101) selects any one of resources of CSI-RS configurations (CSI-RS config (0) to (9)) shown in FIG. 2B as part of interference estimation resources. Base station 100 indicates, to terminal 200, the interference estimation resource information including the selected CSI-RS configuration number (CSI-RS config (i)).

Terminal 200 (reception processing section 203) performs interference estimation using part of CSI-RS config(i) resources indicated in the interference estimation resource information and part of CSI-RS config resources distanced by a predetermined number from CSI-RS config(i).

Here, "3" is set beforehand as the predetermined number and terminal 200 identifies interference estimation resources configured using CSI-RS config(i) and CSI-RS config(i+3). Note that when the value of (i+3) exceeds the CSI-RS config number with the corresponding number of ports, a remainder calculation may be performed. For example, since the number of CSI-RS configs with 4 ports shown in FIG. 2B is 10 (#0 to #9), a remainder may be calculated as mod((i+3), 10). Note that function mod(x, y) is a function that returns a remainder when x is divided by y.

As shown in FIG. 2B, a CSI-RS resource corresponding to each CSI-RS configuration number is configured of 4 REs which are distributed in two OFDM symbol units (2 RE units) on a plurality of (two in FIG. 2B) subcarriers in two consecutive identical OFDM symbols. For example, an interference estimation resource is configured of half (2 REs) of CSI-RS config(i) resources and half (2 REs) of CSI-RS config(i+3) resources.

Figure 9A:
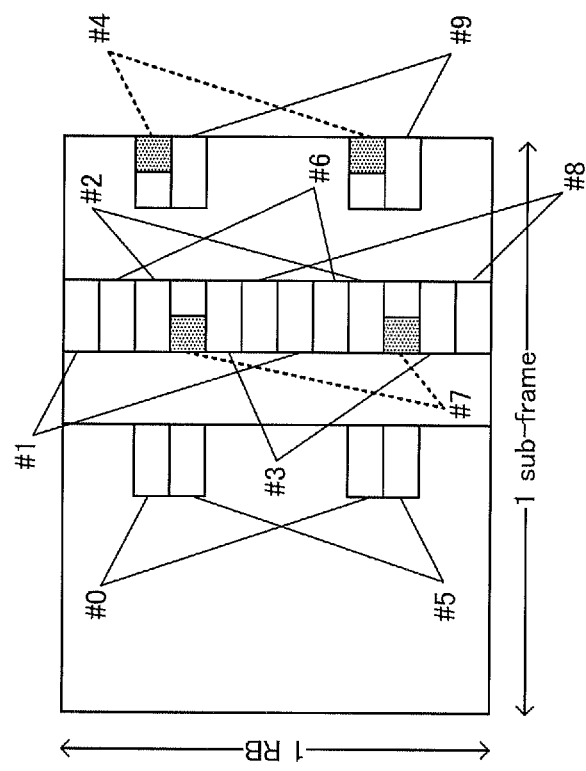
FIGS. 9A and 9B illustrate configuration examples of interference estimation resources according to Embodiment 2 of the present invention.

For example, FIG. 9A illustrates interference estimation resources when CSI-RS config(4) is configured as the interference estimation resource information (i=4). That is, terminal 200 uses CSI-RS config(4) and CSI-RS config(7) which is a number by "3" distanced from CSI-RS config(4) as the interference estimation resources. The interference estimation resources shown in FIG. 9A are configured of 2 REs in CSI-RS config(4) resources and 2 REs in CSI-RS config(7) resources.

In, for example, FIG. 9A, when CSI-RS config(4) is configured in a non-coordinating TP, aforementioned collision may occur in CSI-RS config(4), which is one of resources constituting the interference estimation resource. However, as shown in FIG. 9A, the above-described collision does not take place with non-coordinating TPs in CSI-RS config(7), which is another one of the resources constituting interference estimation resources. That is, terminal 200 can prevent collision with CSI-RS resources of non-coordinating TPs from occurring among all interference estimation resources and can estimate interference. Thus, terminal 200 can reduce the influence of collision with CSI-RSs transmitted from non-coordinating TPs (TPs from which no TP information is obtained) on interference estimation.

From the standpoint of matching CSI reporting timings within a group of coordinating TPs (may also be called CoMP measurement set or coordinating cluster) (that is, terminals 200 simultaneously receive CSI-RSs), it is a general practice to configure CSI-RS resources in such a way that CSI-RSs are transmitted with the same OFDM symbol. That is, CSI-RS resources may be configured of different OFDM symbols among different groups (different coordinating clusters). In contrast, in the CSI-RS configuration shown in FIG. 9A (FIG. 2B), resources of CSI-RS config(i) and resources of CSI-RS config(i+3) may correspond to resources (REs) of non-adjacent and different OFDM symbols at a high rate. More specifically, all combinations other than combination (i=3) of CSI-RS config(3) and CSI-RS config(6) among combinations of CSI-RS config(i) and CSI-RS config(i+3) correspond to resources (REs) of non-adjacent and different OFDM symbols.

Even if CSI-RS resources are configured in a coordinating cluster including non-coordinating TPs in one OFDM symbol of an OFDM symbol corresponding to CSI-RS config(i) and an OFDM symbol corresponding to CSI-RS config(i+3), it is possible to avoid collision with CSI-RSs of the above-described non-coordinating TPs in the other OFDM symbol. Thus, terminal 200 averages the amount of interference using interference estimation resources configured in the other OFDM symbol, and can thereby reduce the influence of collision with CSI-RSs transmitted from non-coordinating TPs on interference estimation.

The interference estimation resources shown in FIG. 9A are configured of 2 REs of different subcarriers and of different OFDM symbols of 4 REs of CSI-RS config(4) and 2 REs of different subcarriers and of different OFDM symbols of 4 REs of CSI-RS config(7). In other words, the interference estimation resources shown in FIG. 9A are configured of one RE (total 2 REs) of two consecutive REs in the time domain of each subcarrier of CSI-RS config(4) and one RE (total 2 REs) of two consecutive REs in the time domain of each subcarrier of CSI-RS config(7). For example, as shown in FIG. 9A, in each of CSI-RS config(4) and CSI-RS config(7), on one subcarrier of different frequencies (subcarriers), an RE of a leading symbol of two consecutive OFDM symbols is extracted as an interference estimation resource, and on the other subcarrier, a last symbol of the two consecutive OFDM symbols is extracted as an interference estimation resource.

By so doing, terminal 200 can perform interference estimation using resources distributed in the frequency domain and time domain.

A CSI-RS is code-multiplexed ((+1, +1) or (+1, −1)) in two consecutive OFDM symbols (corresponding to 2-port CSI-RS) in the time domain on each subcarrier. In contrast, for example, null carriers are expected to be configured in interference estimation resources. That is, interference estimation resources need not be consecutive in the time domain on each subcarrier unlike CSI-RSs, and there is no problem even if it is made up of an RE of one OFDM symbol of each subcarrier as shown in FIG. 9A. As shown in FIG. 9A, since 4 REs which are interference estimation resources are configured and distributed in the time domain, even when collision with CSI-RSs of non-coordinating TPs occurs, the influence is equalized depending on whether code-multiplex of colliding CSI-RSs is (+1, +1) or (+1, −1). This makes it possible to reduce the influence of variations in interference components caused by collision of CSI-RSs.

In each TP, a coding rate of the data signal is determined by taking into account the region from which CSI-RS resources are removed. That is, when a 4-port CSI-RS is configured, rate matching is performed by taking into account the region from which 4 REs are removed. On the other hand, as described above, an interference estimation resource is configured of some (2 REs) of CSI-RS config(i) resources and some (2 REs) of CSI-RS config(i+3) resources (total 4 REs). That is, CSI-RS resources used for transmission of 4-port CSI-RSs and interference estimation resources have different arrangement positions, yet have the same amount of resources (number of REs). As described above, the TP transmits no signal using interference estimation resources configured in the TP. Thus, rate matching is performed in each TP by taking into account the region from which 4 REs as interference estimation resources are removed even in subframes in which interference estimation is performed.

Thus, since the same number of REs as 4-port CSI-RS resources are configured as interference estimation resources, the TP can transmit data signals through the same rate matching as that in subframes in which CSI-RSs are transmitted even in subframes in which interference estimation is performed. That is, terminal 200 can receive data signals without receiving the influence of rate matching depending on whether or not the subframe is one in which interference estimation is performed.

As described above, interference estimation resources are configured using parts of the resources of a plurality of CSI-RS configuration numbers. This makes it possible to prevent an increase in the number of regions of interference estimation resources compared to a case where resources of a plurality of CSI-RS configuration numbers are used as interference estimation resources without modification in order to avoid collision with CSI-RSs in interference estimation. That is, it is possible to prevent deterioration of the system throughput by preventing a decrease in the number of data regions to avoid collision of CSI-RSs in interference estimation.

Thus, in the present embodiment, base station 100, configuration section 101 configures resources of CSI-RS config(i) (first number) from the CSI-RS configurations (reference signal resource group), transmission processing section 104 transmits control information (interference estimation resource information) including CSI-RS config(i) (first number) to terminal 200 and reception processing section 108 receives CSI (channel information) generated using signals transmitted from TPs other than a specific TP through resources (interference estimation resources) configured of resources of CSI-RS config(i) (first number) identified from the above-described control information in terminal 200 and resources of CSI-RS config(i+3) (second number) distanced by a predetermined number (here 3) from CSI-RS config(i), and the CSI-RSs transmitted from the above-described specific TP.

In terminal 200, reception processing section 203 receives CSI-RSs and control information (interference estimation resource information) transmitted from a specific TP, signals transmitted from TPs other than the specific TP using resources (interference estimation resources) configured of resources of CSI-RS config(i) (first number) identified from the above-described control information of the CSI-RS configuration (reference signal resource group) and resources of CSI-RS config(i+3) (second number) distanced by a predetermined number (here, 3) from CSI-RS config(i), CSI generating section 206 generates CSI using CSI-RSs and the above-described signals and transmission signal forming section 208 transmits the generated CSI.

By so doing, a plurality of CSI-RS configs are configured as interference estimation resources, and it is thereby possible to reduce the influence of collision with CSI-RSs from non-coordinating TPs in interference estimation. Thus, terminal 200 can reduce variations in the amount of interference by non-coordinating TPs and accurately perform interference estimation on each TP. Thus, according to the present embodiment, it is possible to improve CSI measuring accuracy between CoMP control target TPs and terminal 200 and achieve CoMP control with high accuracy in consideration of TPs not coordinating with the TP to which the terminal is connected while preventing deterioration of the system throughput.

In the present embodiment, interference estimation resource information is indicated using control such as RRC signaling, and it is thereby possible to reduce an increase in the amount of signaling relating to interference estimation. In the present embodiment, the same amount of resources as CSI-RS resources (4 REs in FIG. 9A) configured in each TP as interference estimation resources. This prevents an increase in the number of patterns of rate matching.

Figure 9B:
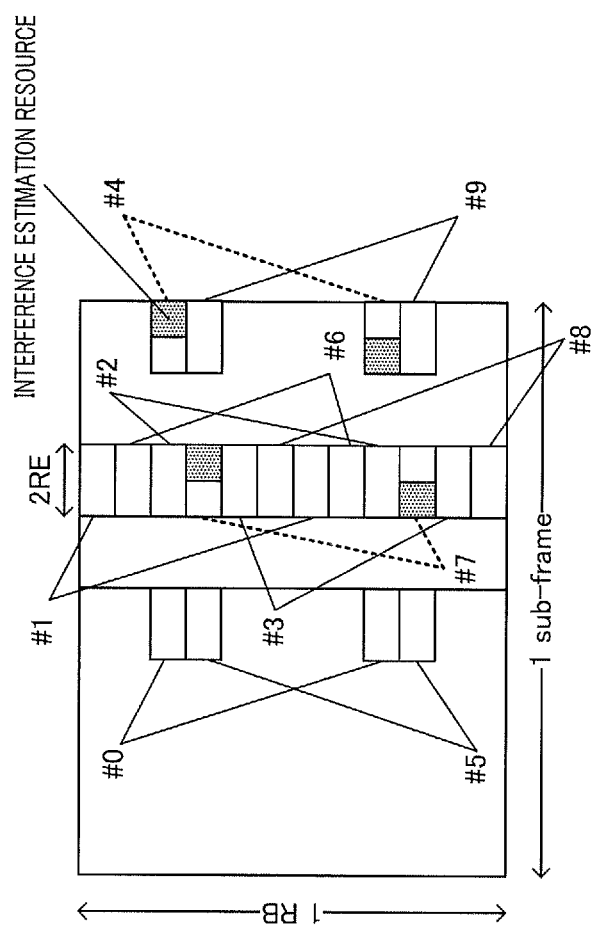

In the present embodiment, interference estimation resources are not limited to the configuration example shown in FIG. 9A. For example, FIG. 9B, like FIG. 9A, illustrates interference estimation resources when CSI-RS config(4) is configured (i=4) as interference estimation resource information. That is, terminal 200 uses CSI-RS config(4) and CSI-RS config(7) as interference estimation resources. The interference estimation resources shown in FIG. 9B are configured of 2 REs in CSI-RS config(4) resources and 2 REs in CSI-RS config(7) resources. For example, as shown in FIG. 9B, CSI-RS config(4) and CSI-RS config(7) are each configured of 2 REs distributed over different subcarriers in any one OFDM symbol of two consecutive OFDM symbols. As shown in FIG. 9B, an RE of the leading symbol of the two consecutive OFDM symbols in one (CSI-RS config(7) in FIG. 9B) of the of CSI-RS config(4) resources and CSI-RS config(7) resources is extracted as an interference estimation resource, and an RE of the last symbol of the two consecutive OFDM symbols is extracted as an interference estimation resource. In this way, it is possible to secure interference estimation results (the number of samples of interference estimation) in the same OFDM symbol (one of the leading symbol and last symbol). It is thereby possible to reduce influences of variations in interference components caused by collision of CSI-RSs while securing channel estimation accuracy due to channel estimation or the like using, for example, DFT (discrete Fourier transform).

A case has been described in the present embodiment as an example where 4-port CSI-RS configuration (FIG. 2B) is used, but without being limited to this, for example, an 8-port CSI-RS configuration (FIG. 2A) may also be used. For example, in an 8-port CSI-RS configuration, 4 REs are extracted from resources corresponding to CSI-RS config(i) indicated as the interference estimation resource and 4 REs are extracted from resources corresponding to CSI-RS config(i+3) of a number distanced by a predetermined interval (here, 3) from CSI-RS config(i). In this way, when, for example, an 8-port CSI-RS configuration is indicated to terminal 200 as TP information, the number of ports need not be indicated separately as interference estimation resources.

FIGS. 10A to 10D illustrate configuration examples of interference estimation resources when an 8-port CSI-RS configuration is used.

Figure 10A:
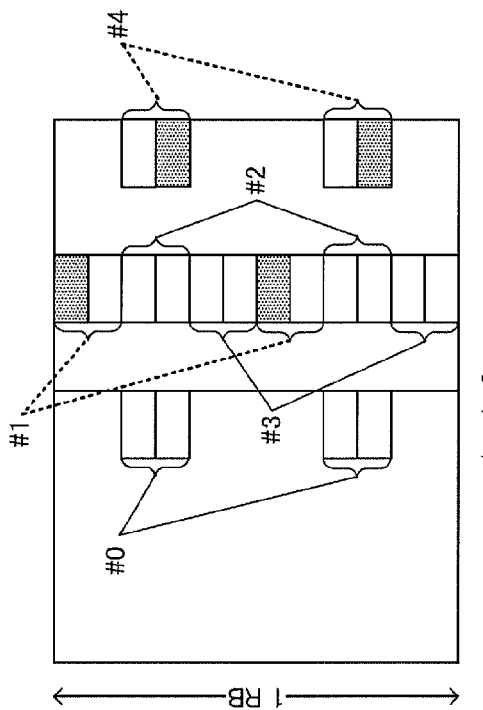
FIGS. 10A to 10D illustrate other configuration examples of interference estimation resources according to Embodiment 2 of the present invention.
Figure 10B:
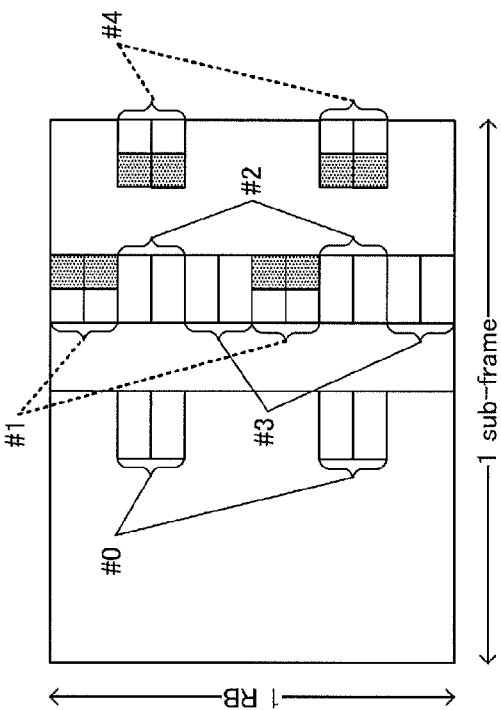

In FIGS. 10A and 10B, 2 REs are extracted as interference estimation resources from two of four subcarriers corresponding to CSI-RS config(i) and CSI-RS config(i+3). Between FIG. 10A and FIG. 10B, different subcarriers are used as interference estimation resources among four subcarriers corresponding to CSI-RS config(4).

Figure 10C:
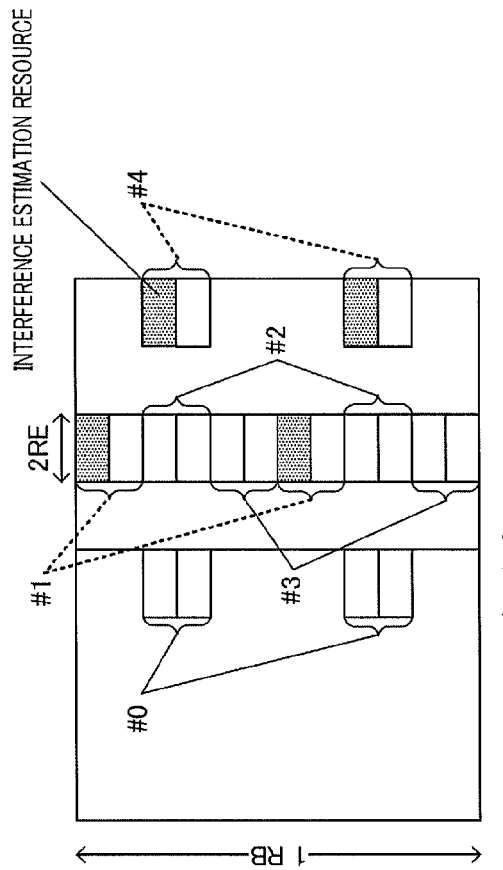
Figure 10D:
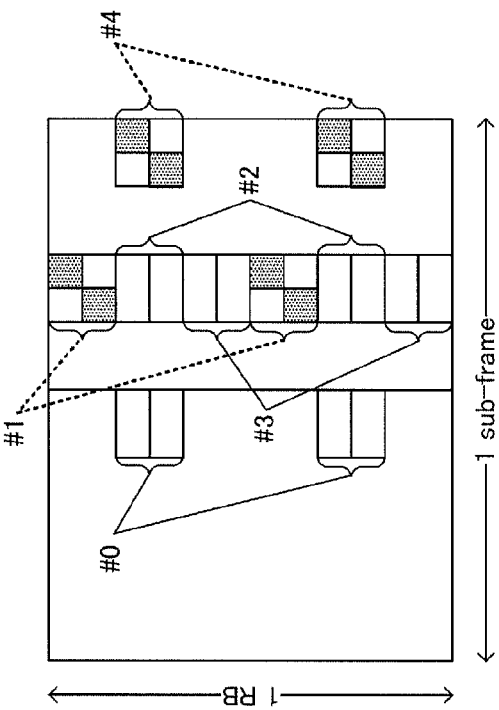

On the other hand, in FIGS. 10C and 10D, one RE is extracted as an interference estimation resource from four subcarriers corresponding to CSI-RS config(i) and CSI-RS config(i+3). Thus, interference estimation is performed using at least one RE in each subcarrier corresponding to CSI-RS config configured in interference estimation resources. In FIG. 10C, in each CSI-RS config configured in interference estimation resources, one RE of different OFDM symbols between neighboring subcarriers is extracted. On the other hand, in FIG. 10D, one RE of the same OFDM symbol between neighboring subcarriers is extracted in each CSI-RS config configured in interference estimation resources. In FIG. 10D, an RE of the leading symbol of the two consecutive OFDM symbols of CSI-RS config(i) and CSI-RS config(i+3) configured in interference estimation resources is extracted on one hand, and one RE of the last symbol of the two consecutive OFDM symbols is extracted on the other.

In the present embodiment, the predetermined number which is an interval of CSI-RS config used as an interference estimation resource is assumed to be "3." However, the predetermined number is not limited to "3." For example, the predetermined number may be set by taking into account a requirement that interference estimation resources should be configured in different OFDM symbols so as to avoid collision with CSI-RSs of the above-described non-coordinating TPs. For example, in the CSI-RS configuration shown in FIG. 9A (FIG. 2B), CSI-RS configs distanced from each other by a predetermined number of "3" may correspond to different and not neighboring OFDM symbols at a high rate. On the other hand, for example, in FIG. 9A (FIG. 2B), CSI-RS configs distanced by a predetermined number of "5" correspond to the same OFDM symbol and neighboring subcarriers. Since the same numbering is intended for the CSI-RS configuration with eight antenna ports (FIG. 2A) and the CSI-RS configuration having the same starting position, this is attributable to "5" as the number of configurations that can be taken as CSI-RS whose number of antenna ports is 8. Thus, as in the present embodiment, when a CSI-RS configuration of a non-coordinating TP is unknown, using "3" as the predetermined number provides a higher probability of avoiding collision with CSI-RSs of non-coordinating TPs than using "5" as the predetermined number.

Embodiment 3

A case has been described in Embodiment 2 where CSI-RS config(i) corresponding to some resources making up interference estimation resources is indicated from a base station to a terminal. In contrast, the present embodiment will describe a case where interference estimation resources are indicated from a base station to a terminal in bitmap notation.

Since the base station and terminal according to the present embodiment have basic configurations common to those of base station 100 and terminal 200 according to Embodiment 1, they will be described with reference to FIGS. 6 and 7.

In base station 100, configuration section 101 generates interference estimation resource information for CSI reporting target terminal 200 just as in Embodiment 2. However, unlike Embodiment 2, configuration section 101 generates an interference estimation CSI-RS configuration number list in bitmap notation as interference estimation resource information as in the parameters of non-transmission signal resources (e.g., non-transmission CSI-RS configuration number list (zeroTxPowerResourceConfigList)). That is, the interference estimation resource information is bitmap type information indicating which of the CSI-RS configurations (CSI-RS resource group) is part of resources making up the interference estimation resources (CSI-RS config(i)). Here, in the bitmap corresponding to each CSI-RS configuration number, "1" represents an interference estimation resource and "0" represents a resource other than the interference estimation resource.

The interference estimation resource information is indicated from base station 100 to terminal 200 beforehand and shared between base station 100 and terminal 200.

On the other hand, in terminal 200, reception processing section 203 identifies interference estimation resources using the interference estimation resource information as in Embodiment 2. Here, unlike Embodiment 2, reception processing section 203 identifies interference estimation resources configured using resources corresponding to a CSI-RS configuration number (e.g., CSI-RS configuration number whose value is "1") shown in the interference estimation CSI-RS configuration number list included in the interference estimation resource information and resources corresponding to a CSI-RS configuration number distanced by a predetermined number from the CSI-RS configuration number shown in the interference estimation CSI-RS configuration number list. Reception processing section 203 then extracts a signal component of the identified interference estimation resource and outputs the extracted signal component to CSI generating section 206.

As in Embodiment 1, each TP does not transmit data signals using interference estimation resources configured in the TP. Thus, the signal component received by the identified interference estimation resource is a signal transmitted from a peripheral TP other than the TP (interference/noise component corresponding to the above-described TP).

CSI generating section 206 generates CSI using CSI-RS of each TP as a desired signal and signal components of interference estimation resources as interference/noise.

Figure 11A:
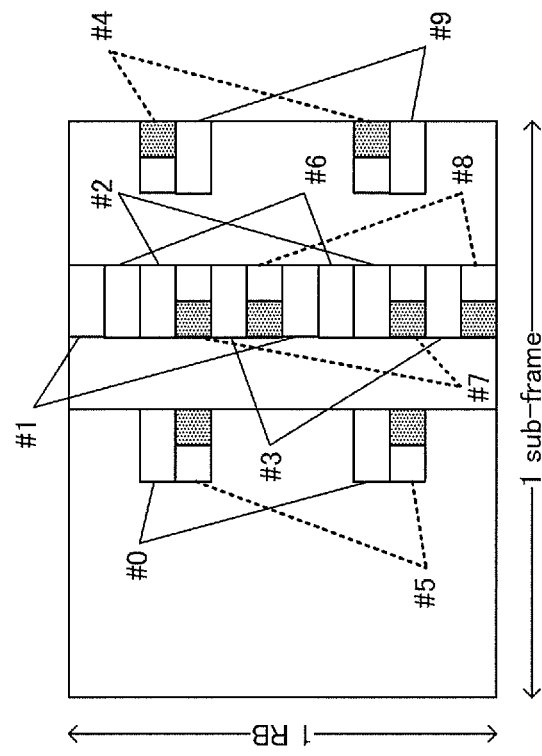
FIGS. 11A and 11B illustrate configuration examples of interference estimation resources according to Embodiment 3 of the present invention.
Figure 11B:
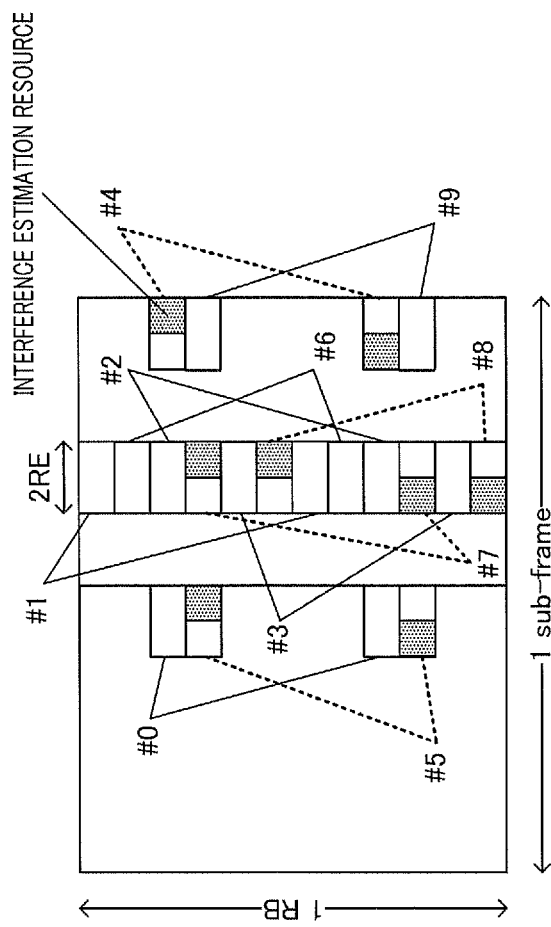

FIGS. 11A and 11B illustrate configuration examples of interference estimation resources in the case of a 4-port CSI-RS configuration.

In FIGS. 11A and 11B, {0, 0, 0, 0, 1, 1, 0, 0, 0, 0} is configured as the interference estimation CSI-RS configuration number list. Here, the interference estimation CSI-RS configuration number list corresponds to config#0 to config#9 in order starting from the leading bit; "1" corresponding to an interference estimation resource and "0" corresponding to a resource other than the interference estimation resource. That is, in this case, CSI-RS config(4) and CSI-RS config(5) are configured in interference estimation resources.

When the interference estimation CSI-RS configuration number list is indicated, terminal 200 (reception processing section 203) identifies 2 REs for each of CSI-RS config(4) and CSI-RS config(5) and 2 REs for each of CSI-RS config(7) and CSI-RS config(8) distanced by a predetermined number ("3" in FIGS. 11A and 11B) from CSI-RS config(4) and CSI-RS config(5) as interference estimation resources.

For example, as in FIG. 9A, interference estimation resources shown in FIG. 11A are configured of 2 REs of different subcarriers of 4 REs in the same CSI-RS config and of different OFDM symbols. On the other hand, just as in FIG. 9B, interference estimation resources shown in FIG. 11B are configured of 2 REs distributed over different subcarriers in any one OFDM symbol of two consecutive OFDM symbols in resources of each CSI-RS config. In the interference estimation resources shown in FIG. 11B, there are CSI-RS config in which an RE of a leading symbol of two consecutive OFDM symbols is extracted, and CSI-RS config in which an RE of a last symbol of the two consecutive OFDM symbols is extracted.

Thus, even when interference estimation resources are indicated using the interference estimation CSI-RS configuration number list, a plurality of CSI-RS configs are configured as interference estimation resources just as in Embodiment 2, and it is thereby possible to reduce the influence of collision with CSI-RSs from non-coordinating TPs. This allows terminal 200 to reduce variations in the amount of interference by non-coordinating TPs and accurately perform interference estimation on each TP. As in Embodiment 2, since interference estimation resources are configured using part of resources of a plurality of CSI-RS configuration numbers, it is possible to prevent deterioration of system throughput by suppressing a decrease in the number of data regions to avoid collision of CSI-RSs in interference estimation. Thus, according to the present embodiment, as in Embodiment 2, it is possible to improve CSI measuring accuracy between CoMP control target TPs and terminal 200 and realize CoMP control with high accuracy while preventing deterioration of system throughput in consideration of TPs not coordinating with a TP to which the terminal is connected.

In the present embodiment just as in Embodiment 2, since interference estimation resource information is indicated using control such as RRC signaling, it is possible to suppress an increase in the amount of signaling relating to interference estimation.

In the present embodiment, a CSI-RS configuration number list is used as interference estimation resource information like non-transmission signal resources as described above. Thus, CSI-RS resources used when the CSI-RS configuration number list is indicated as non-transmission signal resources and CSI-RS resources used when the CSI-RS configuration number list is indicated as interference estimation resources have different arrangement positions, but have the same amount of resources (number of REs). For example, when the CSI-RS configuration number list is {0, 0, 0, 0, 1, 1, 0, 0, 0, 0}, 8 REs in CSI-RS config(4) and CSI-RS config(5) are used as non-transmission signal resources, whereas 8 REs shown in FIGS. 11A and 11B are used when used as interference estimation resources. Thus, even in a subframe in which interference estimation is performed, rate matching is applied with the same number of REs as that when the CSI-RS configuration number list is indicated using non-transmission signal resources, and terminal 200 can thereby receive data signals without receiving the influence of rate matching. In this way, just as in Embodiment 2, it is possible to suppress an increase in the number of rate matching patterns.

Embodiment 4

A case will be described in the present embodiment where a parameter, that is, a predetermined number (hereinafter represented by "j") for using one CSI-RS config indicated with interference estimation resource information to identify the other CSI-RS config is made variable.

Since a base station and a terminal according to the present embodiment have basic configurations common to those of base station 100 and terminal 200 according to Embodiment 1, they will be described with reference to FIGS. 6 and 7.

In base station 100, configuration section 101 configures, in addition to CSI-RS configuration number (CSI-RS config (i)) as in Embodiment 2, predetermined number j indicating an interval between two CSI-RS configs configured in interference estimation resources as interference estimation resource information. Configuration section 101 determines whether predetermined number j is changeable or not in accordance with information exchange performed between base station 100 and a peripheral base station. When configuration section 101 determines that predetermined number j is changeable, configuration section 101 changes predetermined number j and configures interference estimation resource information indicating changed predetermined number j. That is, the interference estimation resource information is information indicating a CSI-RS configuration number (CSI-RS config(i)) of resources making up some resources of interference estimation resources and predetermined number j, and is information indicating, when the predetermined number is changed, only the changed predetermined number. The interference estimation resource information is indicated from base station 100 to terminal 200 using, for example, RRC signaling.

One condition for determining whether interval j of interference estimation resources is changeable or not is that CSI-RS config used for a peripheral base station should not overlap (collide) with CSI-RS config corresponding to interference estimation resources configured in terminal 200.

On the other hand, in terminal 200, reception processing section 203 identifies interference estimation resources using interference estimation resource information (CSI-RS config(i), j) as in Embodiment 2. More specifically, reception processing section 203 identifies CSI-RS config(i) and CSI-RS config(i+j) as interference estimation resources. Since the determination as to which resource among a plurality of resources (RE) included in CSI-RS config(i) and CSI-RS config(i+j) is to be designated as an interference estimation resource is the same as that of Embodiment 2 (e.g., FIGS. 9A and 9B and FIGS. 10A to 10D), description thereof will be omitted here.

Figure 12:
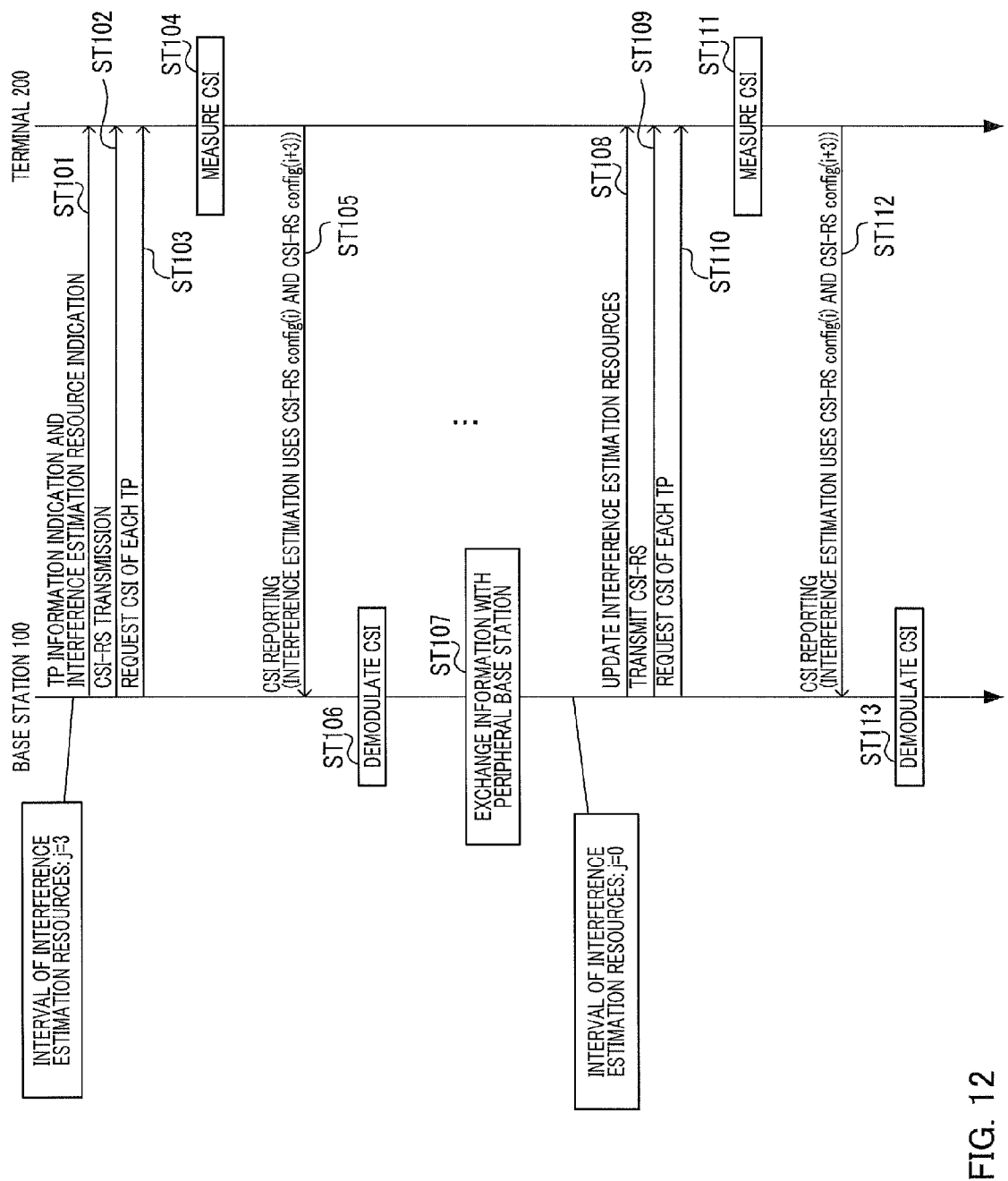
FIG. 12 is a sequence diagram illustrating processing by a base station and a terminal according to Embodiment 4 of the present invention.

Next, a processing flow of base station 100 and terminal 200 will be described. FIG. 12 is a sequence diagram illustrating a processing flow of base station 100 and terminal 200.

In FIG. 12, base station 100 configures J=3 as an initial value of predetermined number j representing an interval of CSI-RS config configured in interference estimation resources.

In step (hereinafter, referred to as "ST") 101, base station 100 indicates TP information and interference estimation resource information to terminal 200. Here, the interference estimation resources include CSI-RS Config(i) and j(=3).

In ST102, base station 100 transmits the CSI-RS configured in base station 100 to base station 200.

In ST103, base station 100 requests terminal 200 for CSI reporting of each TP.

Upon receiving a CSI reporting request in ST103, terminal 200 performs CSI measurement in ST104 using CSI-RS received from each TP including the CSI-RS received in ST102 and signals (interference signals) received using interference estimation resources identified based on the interference estimation resource information received in ST101. That is, terminal 200 generates CSI using CSI-RS of each TP as a desired signal and signal components of interference estimation resources as interference/noise. In this case, terminal 200 performs interference estimation using CSI-RS config(i) and predetermined number j=3 indicated in the interference estimation resource information received in ST101 and using CSI-RS config(i) and CSI-RS config(i+3).

In ST105, terminal 200 reports the CSI measured in ST104 to base station 100.

In ST106, base station 100 demodulates the CSI received in ST105. This CSI is used, for example, for adaptive modulation, frequency scheduling and CoMP control.

In ST107, base station 100 exchanges information with a base station peripheral to base station 100 and thereby determines whether predetermined number j representing an interval of interference estimation resources is changeable or not. In FIG. 12, base station 100 determines that predetermined number j is changeable and changes predetermined number to j=0 based on the determination result.

In ST108, base station 100 indicates interference estimation resource information indicating changed predetermined number j (that is, update of interference estimation resources) to terminal 200.

In ST109, base station 100 transmits the CSI-RS configured in base station 100 to terminal 200 just as in ST102. In ST110, base station 100 requests terminal 200 for CSI reporting of CoMP measurement set.

Upon receiving a CSI reporting request in ST110, terminal 200 performs CSI measurement in ST111 using CSI-RS from each TP including the CSI-RS received in ST109 and signals (interference signals) received using interference estimation resources identified based on the interference estimation resource information received in ST108. In this case, terminal 200 performs interference estimation using CSI-RS config(i) indicated in the interference estimation resource information received in ST101 and predetermined number j=0 indicated in the interference estimation resource information received in ST108. That is, when j=0, interference estimation resources are configured of all resources of CSI-RS config(i).

In ST112, terminal 200 reports the CSI measured in ST111 to base station 100. In ST113, base station 100 demodulates the CSI received in ST111. This CSI is used, for example, for adaptive modulation, frequency scheduling and CoMP control.

Base station 100 and terminal 200 will repeat the above-described processing hereinafter.

Thus, base station 100 exchanges information with peripheral base stations and find out, for example, CSI-RS config of non-coordinating TPs. This allows base station 100 to update interference estimation resources so as not to overlap (collide) with CSI-RS resources of the non-coordinating TPs. That is, terminal 200 updates interference estimation resources based on the interference estimation resource information from base station 100, and can thereby perform interference estimation using resources with which the non-coordinating TPs have transmitted no CSI-RS. For example, as shown in FIG. 12, when a predetermined number is updated to j=0, that is, even when the interference estimation resources are configured of only resources of one CSI-RS config(i), terminal 200 can avoid collision with CSI-RS resources of non-coordinating TPs.

Thus, according to the present embodiment, it is possible to perform interference estimation more accurately than Embodiment 2 by avoiding collision with CSI-RS resources of non-coordinating TPs. That is, according to the present embodiment, it is possible to improve CSI measuring accuracy between CoMP control target TPs and terminal 200 and achieve CoMP control with high accuracy.

In the present embodiment just as in Embodiment 2, interference estimation resource information is indicated using control such as RRC signaling, and it is thereby possible to suppress an increase of the amount of signaling relating to interference estimation. In the present embodiment as in Embodiment 2, the same amount of resources as resources of CSI-RSs configured in each TP is configured as interference estimation resources. This suppresses an increase in the number of rate matching patterns. That is, in the present embodiment, terminal 200 that performs interference estimation can use an existing rate matching pattern even in a subframe in which interference estimation is performed, and it is thereby possible to perform data transmission to a terminal to which no interference estimation resource is indicated, making the coexistence of both terminals easier.

Although a case has been described in the present embodiment where RRC signaling is used to update interference estimation resources, the present invention is not limited to this, and a MAC control element (MAC CE) in which control information is embedded as a header added in the MAC layer may also be used to update interference estimation resources. Using MAC CE to update interference estimation resources makes it possible to change interference estimation resources at a higher speed than changing control information such as TP information.

In the present embodiment, as interference estimation resource information, for example, an interference estimation CSI-RS configuration number list similar to that in Embodiment 3 may be included instead of CSI-RS configuration number (CSI-RS config(i)).

Embodiment 5

While a method of indicating interference estimation resources in the same subframe has been described in Embodiments 1 to 4, the present embodiment will describe a method of indicating interference estimation resources over a plurality of subframes.

Since a base station and a terminal according to the present embodiment have basic configurations common to those of base station 100 and terminal 200 according to Embodiment 1, they will be described with reference to FIGS. 6 and 7. Since operations of base station 100 and terminal 200 in each subframe are similar to those of Embodiments 1 to 4, description thereof will be omitted here.

In base station 100, configuration section 101 configures a transmission period of CSI-RSs and also configures a transmission period of interference estimation resources. In this case, configuration section 101 configures the period (transmission period) during which interference estimation resources are configured in such a way that a least common multiple with the transmission period of CSI-RSs becomes greater. For example, configuration section 101 may configure a transmission period of CSI-RSs and a transmission period of interference estimation resources in such a way that a least common multiple of the transmission period of CSI-RSs and the transmission period of interference estimation resources becomes a predetermined value or greater.

For example, configuration section 101 configures the transmission period of CSI-RSs as TP information to any one of 5, 10, 20, 40, 80 ms (integer multiple of 5 ms). On the other hand, configuration section 101 configures the transmission period of interference estimation resources to any one of 6 ms and 8 ms.

Figure 13:
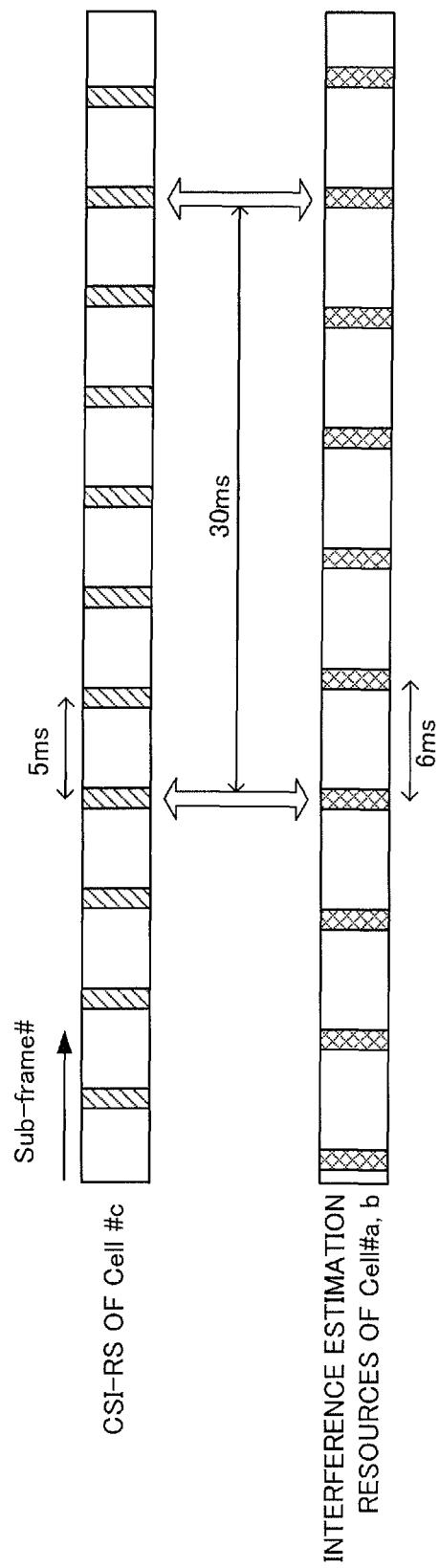
FIG. 13 illustrates a relationship between a transmission period of CSI-RS and a transmission period of interference estimation resources according to Embodiment 5 of the present invention.

For example, FIG. 13 illustrates a case where the transmission period of CSI-RSs is assumed to be 5 ms and the transmission period of interference estimation resources is assumed to be 6 ms. As shown in FIG. 13, subframes of CSI-RSs and subframes of interference estimation resources match at periods of 30 ms which is a least common multiple of the transmission periods.

Similarly, when the transmission period of CSI-RSs is assumed to be 5 ms and the transmission period of interference estimation resources is assumed to be 8 ms (not shown), subframes of CSI-RSs and subframes of interference estimation resources match at periods of 40 ms which is a least common multiple of the transmission periods.

That is, the greater the least common multiple of the transmission period of interference estimation resources and the transmission period of CSI-RSs, the more it is possible to reduce the number of subframes in which interference estimation resources and CSI-RSs overlap (collide) with each other (above-described frequency of collision).

On the other hand, terminal 200 measures CSI using CSI-RSs and interference estimation resources indicated from base station 100 and reports the CSI measurement result to base station 100.

Among a plurality of subframes, it is thereby possible to reduce the frequency of collision between CSI-RS resources of a non-coordinating TP (Cell#c in FIG. 13) and interference estimation resources of coordinating TPs (Cell#a, #b in FIG. 13) and reduce influences of collision on the CSI estimation accuracy.

A case has been described in the present embodiment as an example where a transmission period of interference estimation resources is set to 6 and 8 ms, but the present invention is not limited to this case. For example, when there are five values settable as the transmission period of CSI-RSs (one of 5, 10, 20, 40, 80 ms), the transmission period of interference estimation resources may also be an integer multiple of 6 ms or 8 ms, and may be set to be (one of 6, 12, 18, 24, 30 ms) or (one of 8, 16, 24, 32, 40 ms). It is thereby possible to increase the degree of freedom of configuration of interference estimation resources using the conventional method of indicating transmission subframes, without increasing the amount of signaling.

A case has been described in the present embodiment where when a transmission period of interference estimation resources is configured, the above-described transmission subframes are always used, but the present invention is not limited to this. For example, when CSI reporting assuming inter-cell interference control is configured through, for example, RRC signaling (when resource restricted CSI measurement is configured), one of (8, 16, 24, 32, 40 ms) is applied as the transmission period of interference estimation resources, and in cases other than the above-described case, one of (5, 10, 20, 40, 80 ms) may be applied as the transmission period of interference estimation resources. Thus, it is possible to make transmission subframes of interference estimation resources differ from normal transmission subframes for CSI reporting assuming inter-cell interference control, that is, only a case where a greater amount of interference of a peripheral cell is expected.

Embodiment 6

Each TP performs no transmission using interference estimation resources in Embodiments 1 to 5, but a case will be described in the present embodiment where interference is estimated using known signals transmitted from each TP on interference estimation resources.

As described above, in interference estimation, a terminal is intended to observe signal components arriving from a TP other than a target TP (CSI measurement target) and estimate the observed signal components as an amount of interference to data transmitted from the target TP. The base station appropriately configures known signals that represent the amount of interference, thereby associates CSI-RSs corresponding to a certain TP as desired signals with the amount of interference estimated using the known signals, and can thereby measure CSI.

Thus, by separately indicating known signals used for estimation of the amount of interference and known signals (CSI-RSs) used for estimation of desired signals, it is possible to apply precoding used for data transmission and express the amount of interference conforming to the amount of data transmitted from the corresponding TP as power (maximum transmission power is assigned to CSI-RSs used for estimation of desired signals, and if the amount of data is set to on the order of half the total amount of resources, power by 3 dB lower than that is applied). Moreover, since it is not necessary to distinguish signals of the coordinating TPs for each TP and the amount of interference obtained from totaling can only be measured, it is possible to share interference estimation resources to be used for each coordinating TP.

Figure 14A:
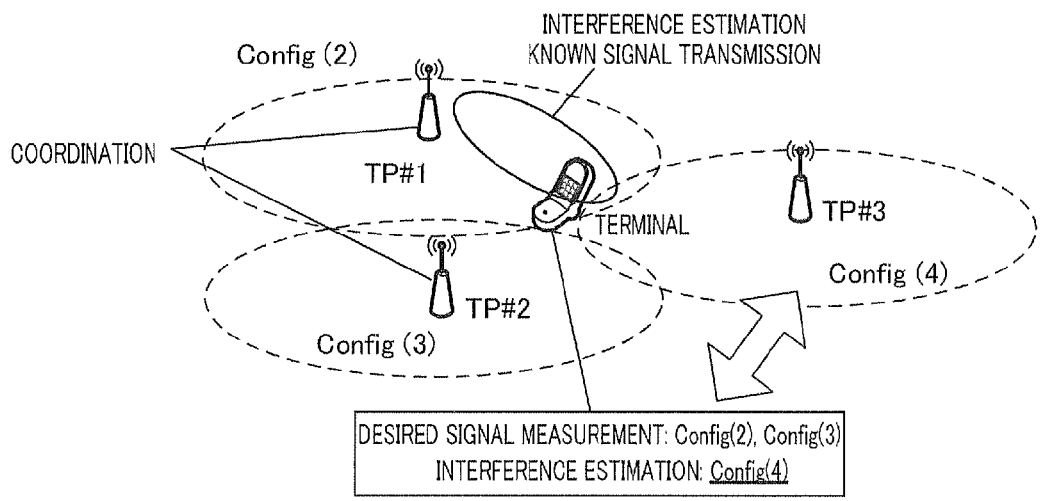
FIGS. 14A and 14B are diagrams provided for describing collision with a non-coordinating TP according to Embodiment 6 of the present invention.

For example, as shown in FIG. 14A, a case will be described where a terminal is located in a CoMP measurement set in which TP#1 and TP#2 are coordinating with each other and TP#3 is not coordinating with TP#1 and #2. In FIG. 14A, CSI-RS config(2) is configured in TP#1 as CSI-RS resources, CSI-RS config(3) is configured in TP#2 and CSI-RS config(4) is configured in TP#3. In addition, CSI-RS config(4) is configured as interference estimation resources for a CSI measurement target TP (e.g., suppose TP#1). In this case, CSI-RS config(2) and CSI-RS config(3) are indicated to the terminal as CSI-RS resources of coordinating TP#1 and #2, and CSI-RS config(4) is indicated to the terminal as interference estimation resources.

In the present embodiment, in the case of FIG. 14, in subframes in which interference estimation resources are configured, TP#1 (CSI measurement target) of TP#1 and #2 (coordinating TP) transmits known signals to which precoding used for data transmission (or which expresses the amount of interference as power) is applied using resources corresponding to CSI-RS config(4).

Note that since the base station and terminal according to the present embodiment have basic configurations common to those of base station 100 and terminal 200 according to Embodiment 1, they will be described with reference to FIGS. 6 and 7.

In base station 100, configuration section 101 generates interference estimation resource information for CSI reporting target terminal 200 in addition to the operation of Embodiment 1. As CSI-RS parameters of each TP, the interference estimation resource information includes transmission subframes configured of a CSI-RS configuration number (CSI-RS config(i)), a transmission period and an offset.

The interference estimation resource information is indicated from base station 100 to terminal 200 beforehand and shared between base station 100 and terminal 200. The configuration information including the interference estimation resource information is indicated from base station 100 to terminal 200, for example, through RRC signaling. For example, base station 100 may also indicate the configuration information included in a CSI-RS-Config message. Base station 100 may also configure which of periodic CSI reporting or aperiodic CSI reporting is applicable to CSI reporting target terminal 200 and indicate the configured information included in a CQI-ReportConfig message.

On the other hand, in terminal 200, reception processing section 203 extracts TP information, interference estimation resource information, assignment control information, trigger information and data signals. As in Embodiment 1, reception processing section 203 extracts reference signals (e.g., CSI-RSs) from the received signal based on CSI-RS parameters of each TP indicated in TP information and outputs reference signals (received values) to CSI generating section 206.

Reception processing section 203 identifies interference estimation resources using interference estimation resource information. More specifically, reception processing section 203 identifies interference estimation resources configured using resources corresponding to a CSI-RS configuration number (e.g., CSI-RS config(i)) indicated in the interference estimation resource information, resources corresponding to a CSI-RS configuration number distanced by a predetermined number from the CSI-RS configuration number (CSI-RS config(i)) indicated in interference estimation resource information out of the CSI-RS configuration (CSI-RS resource group). Reception processing section 203 extracts signal components from the identified interference estimation resources and outputs the extracted signal components to CSI generating section 206.

Next, a configuration example of interference estimation resources will be described. Here, a 2-port CSI-RS configuration shown in FIG. 15 will be described as an example.

Figure 15:
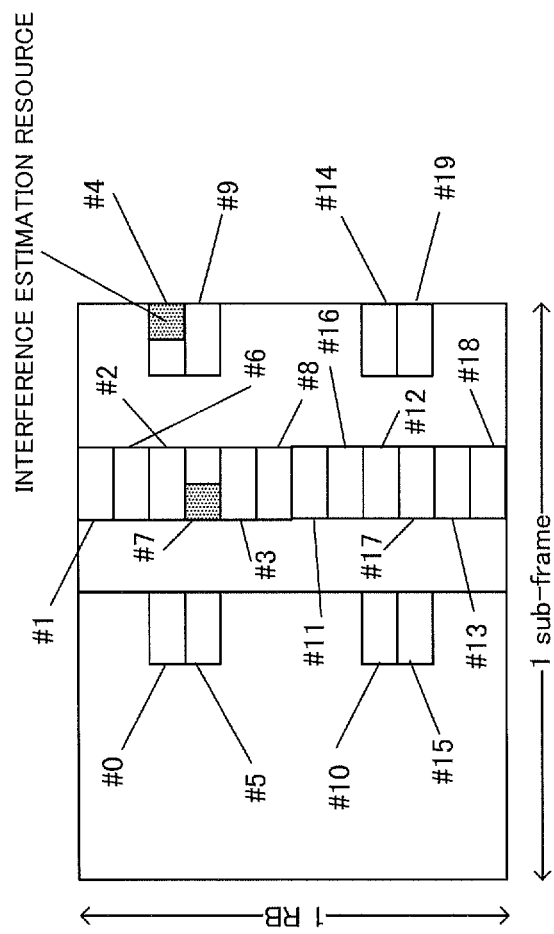
FIG. 15 illustrates a configuration example of interference estimation resources according to Embodiment 6 of the present invention.

For example, FIG. 15 illustrates interference estimation resources when CSI-RS config(4) is configured as interference estimation resource information (i=4). That is, terminal 200 uses CSI-RS config(4) and CSI-RS config(7) of a number distanced by "3" from CSI-RS config(4) as interference estimation resources. The interference estimation resources shown in FIG. 15 are configured of 1 RE in resources of CSI-RS config(4) and 1 RE in CSI-RS config (7). As in Embodiment 1, it is thereby possible to reduce chances of collision with non-coordinating TPs and terminal 200 can reduce the influence of collision with CSI-RSs transmitted from non-coordinating TPs (TPs whose TP information cannot be obtained) on interference estimation.

In each TP, the coding rate of a data signal is determined in consideration of a region from which CSI-RS resources are removed. That is, when 2-port CSI-RSs are configured, rate matching is performed in consideration of the region from which 2 REs are removed. On the other hand, as described above, the interference estimation resources are configured of some (1 RE) of CSI-RS config(i) resources and some (1 RE) of CSI-RS config(i+3) resources (total 2 REs). That is, CSI-RS resources used for transmission of 2-port CSI-RSs and interference estimation resources have different arrangement positions but have the same amount of resources (number of REs). As described above, a TP transmits not data but known signals using interference estimation resources configured in the TP. Thus, each TP performs rate matching in consideration of a region from which 2 REs which are interference estimation resources are removed also in subframes in which interference estimation is performed.

Thus, since the same number of REs as resources of 2-port CSI-RSs are configured as interference estimation resources, the TP can transmit data signals through the same rate matching as that in subframes in which CSI-RSs are transmitted also in subframes in which interference estimation is performed. That is, terminal 200 can receive data signals without receiving the influence of rate matching depending on whether or not each subframe is one in which interference estimation is performed.

As described above, the interference estimation resources are configured using part of resources of a plurality of CSI-RS configuration numbers. In this way, it is possible to suppress an increase in the number of regions of interference estimation resources compared to a case where resources of a plurality of CSI-RS configuration numbers are used as interference estimation resources without modification to avoid collision with CSI-RS in interference estimation. That is, it is possible to prevent deterioration of system throughput by preventing a decrease in the number of data regions to avoid collision of CSI-RSs in interference estimation.

Thus, in the present embodiment, in base station 100, configuration section 101 configures resources of CSI-RS config(i) (first number) from a CSI-RS configuration (reference signal resource group), transmission processing section 104 transmits control information including CSI-RS config(i) (first number) (interference estimation resource information) to terminal 200, and reception processing section 108 receives signals transmitted from TPs other than a specific TP and CSI (channel information) generated using CSI-RSs transmitted from the above-described specific TP using resources of CSI-RS config(i) (first number) identified from the above-described control information in terminal 200 and resources configured of resources of CSI-RS config (i+3) (second number) distanced by a predetermined number (here, 3) from CSI-RS config(i) (interference estimation resources).

In terminal 200, reception processing section 203 receives CSI-RSs transmitted from the specific TP and control information (interference estimation resource information), receives known signals transmitted from the specific TP using resources of CSI-RS config(i) (first number) identified from the above-described control information out of the CSI-RS configuration (reference signal resource group) and resources (interference estimation resources) made up of resources of CSI-RS config(i+3) (second number) distanced by a predetermined number (here, 3) from CSI-RS config(i), CSI generating section 206 generates CSI using CSI-RSs, the above-described signal, and known signals, and transmission signal forming section 208 transmits the generated CSI.

In this way, a plurality of CSI-RS configs are configured as interference estimation resources, and it is thereby possible to reduce the influence of collision with CSI-RSs from non-coordinating TPs in interference estimation. This allows terminal 200 to reduce variations in the amount of interference from the non-coordinating TPs and accurately perform interference estimation on each TP. Thus, according to the present embodiment, it is possible to improve CSI measuring accuracy between CoMP control target TPs and terminal 200 and achieve CoMP control with high accuracy while preventing deterioration of system throughput in consideration of TPs not coordinating with a TP to which the terminal is connected.

In the present embodiment, interference estimation resource information is indicated using control such as RRC signaling, and it is thereby possible to suppress an increase in the amount of signaling relating to interference estimation. In the present embodiment, the same amount of resources (2 REs in FIG. 15) as resources of CSI-RSs configured in each TP is configured as interference estimation resources. It is thereby possible to suppress an increase in the number of rate matching patterns.

Although a case has been described in the present embodiment as an example where a 2-port CSI-RS configuration is used, the present invention is not limited to this, but, for example, a 4-port or 8-port CSI-RS configuration may also be used. For example, in an 8-port CSI-RS configuration, 4 REs are extracted from resources corresponding to CSI-RS config(i) indicated as interference estimation resources and 4 REs are extracted from resources corresponding to CSI-RS config(i+3) of a number distanced by a predetermined interval (here, 3) from CSI-RS config(i). When, for example, an 8-port CSI-RS configuration is indicated to terminal 200 as TP information, the necessity for separately indicating the number of ports as interference estimation resources is eliminated.

In the present embodiment, the predetermined number which is an interval between CSI-RS configs used as interference estimation resources is assumed to be "3." However, the above-described predetermined number is not limited to "3." For example, as described above, the above-described predetermined number may be configured in considering that interference estimation resources should be configured in different OFDM symbols so as to avoid collision with CSI-RSs of non-coordinating TPs. For example, in the CSI-RS configuration shown in FIG. 15, there is a high rate at which CSI-RS configs distanced by a predetermined number "3" from each other correspond to different and not neighboring OFDM symbols. On the other hand, for example, in FIG. 15, CSI-RS configs distanced by a predetermined number "5" from each other correspond to the same OFDM symbol and neighboring subcarriers. Since the same numbering is intended for the CSI-RS configuration with eight antenna ports (FIG. 2A) and the CSI-RS configuration having the same starting position, this is attributable to "5" as the number of configurations that can be taken as CSI-RS whose number of antenna ports is 8. Thus, when a CSI-RS configuration of non-coordinating TPs is unknown, as in the present embodiment, using "3" as the above-described predetermined number increases the probability of being able to avoid collision with CSI-RSs of the non-coordinating TPs than using "5" as the above-described predetermined number.

Figure 14B:
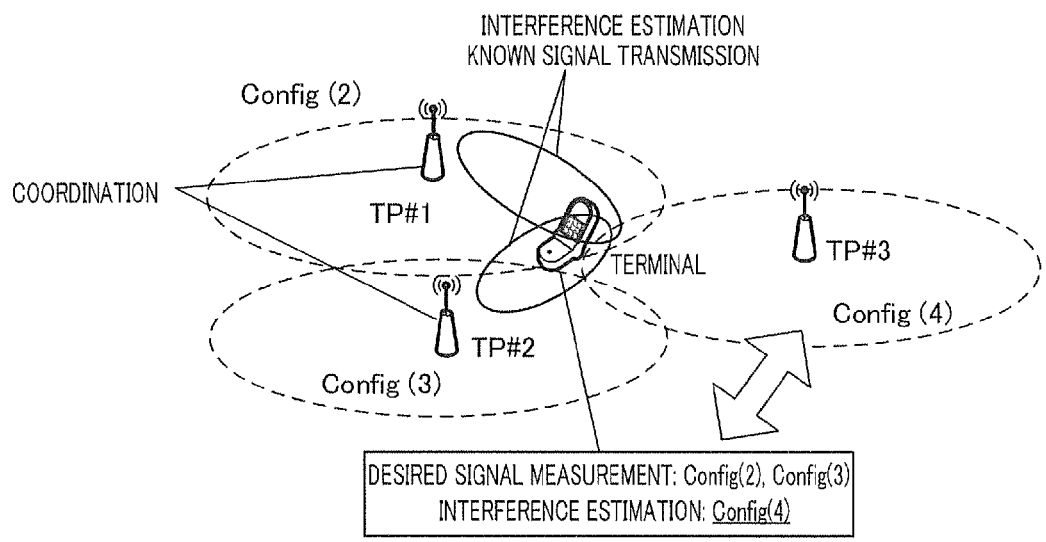

A configuration in which only a specific TP (TP#1 in FIG. 14A) transmits known signals using interference estimation resources has been described here, but without being limited to this, it is also possible to adopt a configuration in which the same known signal is transmitted from a plurality of coordinating TPs using the same resource (FIG. 14B).

Embodiment 7

A configuration has been described in Embodiments 1 to 6 above where at any timing of a configured transmission subframe or at any RB in a transmission subframe, known signals are always transmitted using specific CSI-RS config. In contrast, a case will be described in the present embodiment where interference estimation is performed by switching to a frequency direction or time direction using a plurality of CSI-RS configs that can be indicated without increasing the amount of signaling through the above-described means. Note that the present embodiment is similar to Embodiment 6 except changing the configuration of interference estimation resources.

Figure 16:
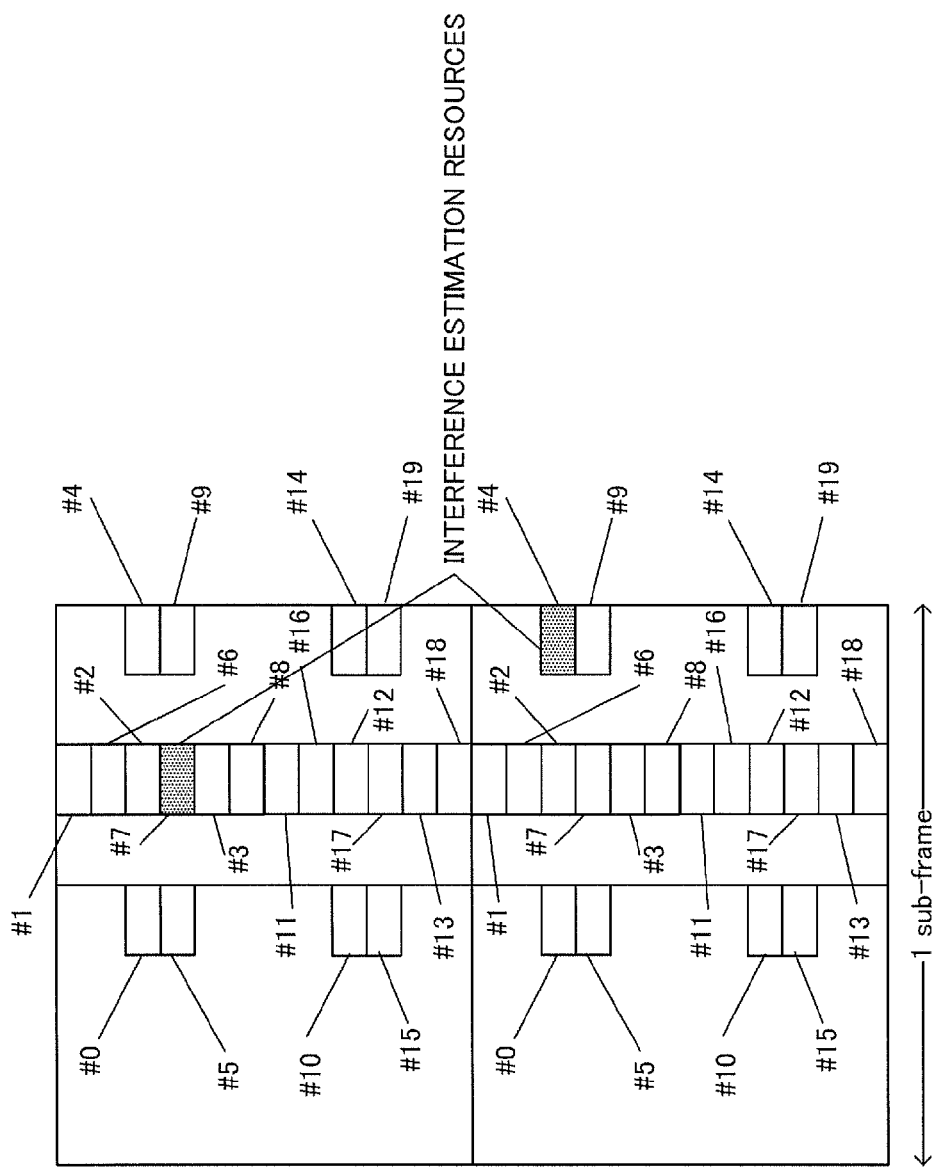
FIG. 16 illustrates a configuration example of interference estimation resources according to Embodiment 7 of the present invention.

FIG. 16 illustrates an example where CSI-RS configs are switched around in the frequency direction and used. An operation is assumed here in which interference is estimated by observing known signals arranged in 2 REs of CSI-RS config(4) at an odd-numbered RB and 2 REs of CSI-RS config(7) at an even-numbered RB.

Thus, when there is the influence of collision with CSI-RSs of non-coordinating TPs, for example, even when TP #4 is transmitting CSI-RSs according to CSI-RS config(4) in the corresponding subframe, half the interference estimation resources can be observed without receiving the influences, and it is thereby possible to reduce variations in the amount of interference from non-coordinating TPs and accurately perform interference estimation on each TP.

Figure 17:
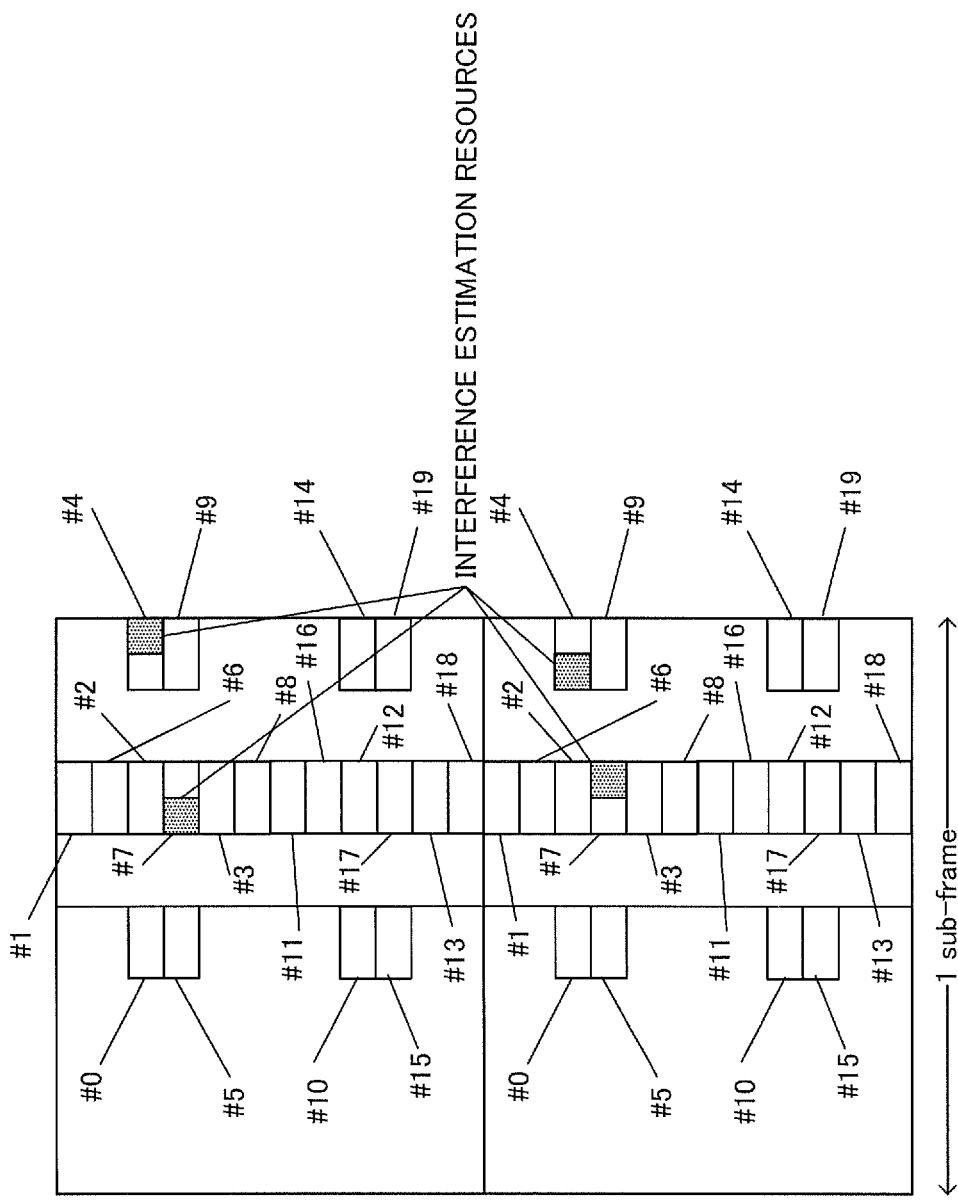
FIG. 17 illustrates another configuration example of interference estimation resources according to Embodiment 7 of the present invention.

As shown in FIG. 17, an operation may also be adopted in which interference is estimated by observing known signals arranged on 1 RE of a leading symbol of CSI-RS config(4) at an odd-numbered RB and 1 RE of the last symbol of CSI-RS config(7), and on the contrary, observing known signals arranged on 1 RE of the last symbol of CSI-RS config(4) at an even-numbered RB and 1 RE of the leading symbol of CSI-RS config(7). It is thereby possible to vary the influence of collision with CSI-RSs of non-coordinating TPs between neighboring RBs.

Figure 18:
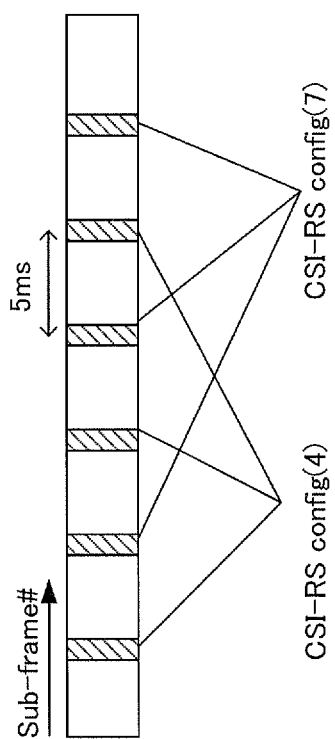
FIG. 18 illustrates an example where CSI-RS configuration numbers are used by being switched around in a time direction according to Embodiment 7 of the present invention.
Figure 19:
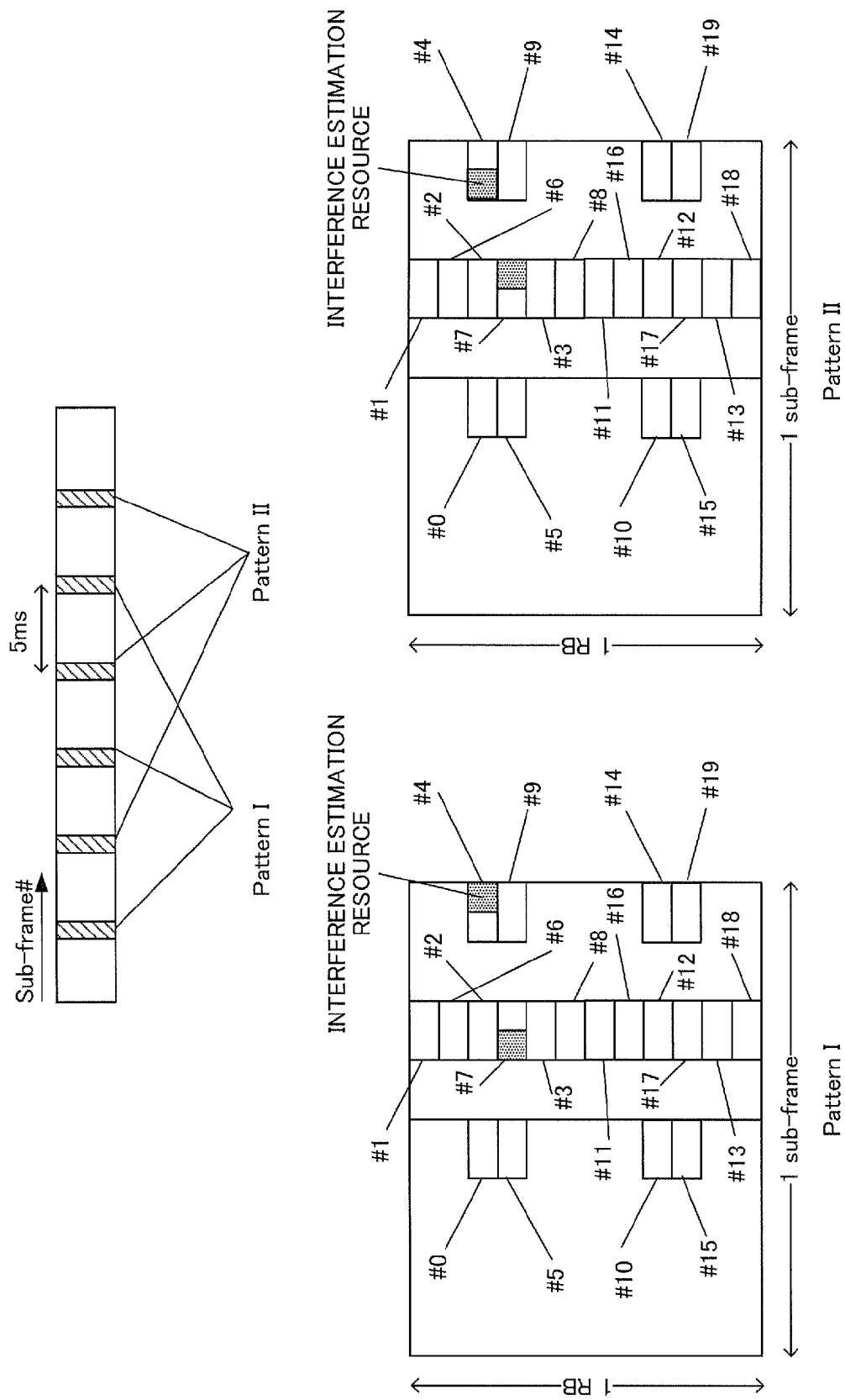
FIG. 19 illustrates examples where configurations of interference estimation resources are used by being switched around in a time direction according to Embodiment 7 of the present invention.

Similarly, FIG. 18 illustrates an example where CSI-RS configs are switched around in the time direction. As shown in FIG. 18, an operation may be adopted in which CSI-RS config(4) and CSI-RS config(7) are switched around in every transmission subframe of interference estimation resources. Furthermore, as shown in FIG. 19, pattern I using 1 RE of the last symbol of CSI-RS config(4) and 1 RE of the leading symbol of CSI-RS config(7), and pattern II using 1 RE of the leading symbol of CSI-RS config(4) and 1 RE of the last symbol of CSI-RS config(7) may be switched round in every transmission subframe of interference estimation resources and used. It is thereby possible to vary the influence of collision with CSI-RSs of non-coordinating TPs between a plurality of transmission subframes.

Embodiment 8

Although a case has been described in Embodiments 1 to 7 above where interference estimation is performed using a plurality of CSI-RS configs, there are further problems when CSI-RS config in which desired signals are observed and CSI-RS config of interference estimation resources indicate different transmission subframes.

More specifically, it is assumed that desired signal observation CSI-RS of TP #a, interference estimation resources, and desired signal observation CSI-RS of TP #b are transmitted in the time direction in that order. In this case, using both CSI-RS config(4) and CSI-RS config(7) as interference estimation resources, CSI-RS config(7) of desired signal observation CSI-RS of TP #a and interference estimation resources, that is, CSI calculated using the third and fourth symbols of the last half slot designates CSI-RS config(4) as an observation target as interference estimation resources, which means that it is not until the final symbol of the last half slot that CSIs can be calculated. Similarly, CSI-RS config(4) of interference estimation resources, that is, when CSI calculated using the sixth and seventh symbols of the last half slot and desired signal observation CSI-RS of TP #b designates CSI-RS config(7) as an observation target as interference estimation resources, it is necessary to save the observation values starting from earlier timings, and in addition, an increase of time difference between such a desired signal observation CSI-RS and interference estimation resource causes a time variation in channel and deterioration of CSI measuring accuracy.

Figure 20:
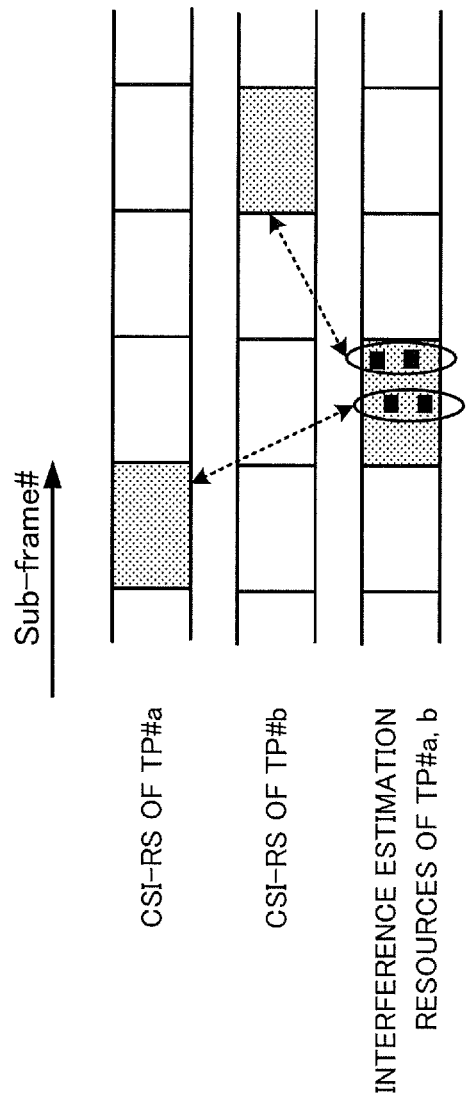
FIG. 20 illustrates an example of using only CSI-RS configuration numbers temporally close to CSI-RS for desired signal calculation according to Embodiment 8 of the present invention.

For this reason, as shown in FIG. 20, when performing interference estimation using a plurality of CSI-RS configs, the present embodiment adopts a configuration in which only CSI-RS configs temporally close to CSI-RSs for calculation of desired signals identified for CSI measurement are used.

Accordingly, it is possible to eliminate the influence of the aforementioned time difference and to secure CSI measuring accuracy. More specifically, for example, a terminal that has received a CSI report based on trigger information from the base station in a CSI-RS transmission subframe of TP#a observes only CSI-RS config temporally close to the corresponding CSI-RS (e.g., #7), can thereby estimate interference without waiting to demodulate all OFDM symbols of an interference estimation resource transmission subframe, can secure a processing time corresponding to the remaining symbols of the corresponding subframe when generating CSI, and consequently increase the possibility of realizing CSI reporting in accordance with the corresponding trigger information.

The embodiments of the present invention have been described thus far.

Other Embodiments (1) In the embodiments described above, the term "antenna port" refers to a logical antenna including one or more physical antennas. In other words, the term "antenna port" does not necessarily refer to a single physical antenna, and may sometimes refer to an array antenna including a plurality of antennas and/or the like.

For example, in 3GPP LTE, how many physical antennas are included in the antenna port is not defined, but the antenna port is defined as the minimum unit allowing the base station to transmit different reference signals.

In addition, an antenna port may be specified as a minimum unit to be multiplied by a precoding vector weighting.

(2) In the embodiments described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal according to this disclosure includes: a receiving section that receives a reference signal transmitted from a specific transmission point and control information, and that receives a signal transmitted from a transmission point other than the specific transmission point using resources including a resource of a first number and a resource of a second number, the first number being identified by the control information from among a reference signal resource group, the second number being distanced from the first number by a predetermined number; a generating section that generates channel information using the reference signal and the signal; and a transmitting section that transmits the generated channel information.

In the terminal according to this disclosure, the resources include a first resource which is part of the resource of the first number and a second resource which is part of the resource of the second number.

In the terminal according to this disclosure: each resource of the resource group includes resource elements distributed over a plurality of subcarriers within an identical symbol in units of two consecutive symbols; and the first resource and the second resource each include mutually different subcarriers and resource elements of mutually different symbols.

In the terminal according to this disclosure: each resource of the resource group includes resource elements distributed over a plurality of subcarriers within an identical symbol in units of two consecutive symbols; and the first resource and the second resource each include resource elements distributed over mutually different subcarriers within one of the two symbols.

In the terminal according to this disclosure, one of the first resource and the second resource includes resource elements of a leading symbol of the two symbols and the other one of the first resource and the second resource includes resource elements of a last symbol of the two symbols.

In the terminal according to this disclosure, the resource of the first number and the resource of the second number include resource elements of different symbols that are not adjacent to each other.

In the terminal according to this disclosure, the number of resource elements included in the resources is identical to the number of resource elements included in a resource used for transmission of the reference signal.

In the terminal according to this disclosure, the control information is information indicating the first number.

In the terminal according to this disclosure, the control information is bitmap information indicating which resource is the resource of the first number among the resource group.

In the terminal according to this disclosure, the control information is information indicating the first number and the predetermined number, and is information indicating, when the predetermined is changed, only the changed predetermined number.

In the terminal according to this disclosure, a least common multiple of a transmission period of the reference signal and a period in which the resources are configured is equal to or greater than a predetermined value.

In the terminal according to this disclosure: each resource of the resource group includes resource elements in units of two consecutive symbols on a single subcarrier within an identical symbol; and one of the first resource and the second resource includes a resource element of a leading symbol of the two symbols and the other one of the first resource and the second resource includes a resource element of a last symbol of the two symbols.

In the terminal according to this disclosure: the receiving section receives a known signal transmitted from the specific transmission point; and the generating section generates channel information using the reference signal, the signal and the known signal.

In the terminal according to this disclosure: each resource of the resource group includes resource elements distributed over a plurality of subcarriers within an identical symbol in units of two consecutive symbols; and the first resource and the second resource each include resource elements in mutually different resource blocks.

In the terminal according to this disclosure: the first resource includes resource elements distributed in one of the two symbols and the other one of the two symbols of a resource block different from that of the one of the two symbols; and the second resource includes resource elements that are of a symbol different from that of the first resource and that are distributed over one of the two symbols and the other one of the two symbols of the resource block different from that of the one of the two symbols.

In the terminal according to this disclosure, the resources include different resource elements between subframes distanced by a transmission period.

In the terminal according to this disclosure, the generating section generates the channel information using the control information temporally close to the reference signal.

A base station according to this disclosure includes: a configuration section that configures a resource of a first number from among a reference signal resource group; a transmitting section that transmits control information including the first number to a terminal; and a receiving section that receives channel information generated using a signal transmitted from a transmission point other than a specific transmission point and a reference signal transmitted from the specific transmission point, the signal from the transmission point other than the specific transmission point being transmitted using resources including the resource of the first number identified by the control information in the terminal and a resource of a second number distanced from the first number by a predetermined number.

A transmission method according to this disclosure includes: receiving a reference signal transmitted from a specific transmission point and control information, and receiving a signal transmitted from a transmission point other than the specific transmission point using resources including a resource of a first number and a resource of a second number, the first number being identified by the control information from among a reference signal resource group, the second number being distanced from the first number by a predetermined number; generating channel information using the reference signal and the signal; and transmitting the generated channel information.

A reception method according to this disclosure includes: configuring a resource of a first number from among a reference signal resource group; transmitting control information including the first number to a terminal; and receiving channel information generated using a signal transmitted from a transmission point other than a specific transmission point and a reference signal transmitted from the specific transmission point, the signal from the transmission point other than the specific transmission point being transmitted using resources including the resource of the first number identified by the control information in the terminal and a resource of a second number distanced from the first number by a predetermined number.

The disclosures of the specifications, the drawings, and the abstracts included in Japanese Patent Application No. 2012-013002 filed on Jan. 25, 2012 and Japanese Patent Application No. 2012-061977 filed on Mar. 19, 2012 are incorporated herein by reference in their entirety.

INDUSTRIAL APPLICABILITY

The present invention is useful in mobile communication systems, for example.

REFERENCE SIGNS LIST

100 Base station
101 Configuration section
102,103 Coding and modulation section
104 Transmission processing section
105, 209 Transmitting section
106, 201 Antenna
107, 202 Receiving section
108, 203 Reception processing section
109 DATA receiving section
110 CSI receiving section
200 Terminal
204 Reference signal generating section
205 Data signal generating section
206 CSI generating section
207 Transmission control section
208 Transmission signal forming section

The invention claimed is:

1. A terminal comprising:
a receiver which, in operation, receives a reference signal transmitted from a specific transmission point and control information, and receives a signal transmitted from a transmission point other than the specific transmission point using resources including a resource identified a first number and a resource identified by a second number, the first number being identified by the control information, the first number and the second number identifying resources included in a reference signal resource group, the second number being determined using the first number and a redetermined number;
circuitry which, in operation, generates channel information using the reference signal and the signal; and
a transmitter which, in operation, transmits the generated channel information;
wherein,
the resources include a first resource which is part of the resource identified by the first number and a second resource which is part of the resource identified by the second number;
each resource of the resource group includes resource elements distributed over a plurality of subcarriers within an identical symbol in units of two consecutive symbols; and
the first resource and the second resource each include resource elements of mutually different subcarriers and of mutually different symbols.

2. A terminal comprising:
a receiver which, in operation, receives a reference signal transmitted from a specific transmission point and control information, and receives a signal transmitted from a transmission point other than the specific transmission point using resources including a resource identified by a first number and a resource identified by a second number, the first number being identified by the control information, the first number and the second number identifying resources included in a reference signal resource group, the second number being determined using the first number and a predetermined number;
circuitry which, in operation, generates channel information using the reference signal and the signal; and
a transmitter which, in operation, transmits the generated channel information;
wherein,
the resources include a first resource which is part of the resource identified by the first number and a second resource which is part of the resource identified by the second number;
each resource of the resource group includes resource elements distributed over a plurality of subcarriers within an identical symbol in units of two consecutive symbols; and
the first resource and the second resource each include resource elements distributed over mutually different subcarriers within one of the two symbols.

3. The terminal according to claim 2, wherein one of the first resource and the second resource includes resource elements of a leading symbol of the two symbols and the other one of the first resource and the second resource includes resource elements of a last symbol of the two symbols.

4. The terminal according to claim 1, wherein the resource identified by the first number and the resource identified by the second number include resource elements of different symbols that are not adjacent to each other.

5. The terminal according to claim 1, wherein the number of resource elements included in the resources is identical to the number of resource elements included in a resource used for transmission of the reference signal.

6. The terminal according to claim 1, wherein the control information is information indicating the first number.

7. The terminal according claim 1, wherein the control information is bitmap information indicating which resource is the resource identified by the first number among the resources included in the reference signal resource group.

8. The terminal according to claim 1, wherein the control information is information indicating the first number and the predetermined number, and is information indicating, when the predetermined number is changed, only the changed predetermined number.

9. The terminal according to claim 1, wherein a least common multiple of a transmission period of the reference signal and a period in which the resources are configured is equal to or greater than a predetermined value.

10. The terminal according claim 1, wherein:
each resource of the resource group includes resource elements in units of two consecutive symbols on a single subcarrier within an identical symbol; and
one of the first resource and the second resource includes a resource element of a leading symbol of the two symbols and the other one of the first resource and the second resource includes a resource element of a last symbol of the two symbols.

11. The terminal according to claim 10, wherein:
the receiver, in operation, receives a signal to which precoding used for data transmission is applied transmitted from the specific transmission point; and
the circuitry, in operation, generates channel information using the reference signal, the signal and the signal to which precoding used for data transmission is applied.

12. A terminal comprising:
a receiver which, in operation, receives a reference signal transmitted from a specific transmission point and control information, and receives a signal transmitted from a transmission point other than the specific transmission point using resources including a resource identified by a first number and a resource identified by a second number, the first number being identified by the control information, the first number and the second number identifying resources included in a reference signal resource group, the second number being determined using the first number and a predetermined number;
circuitry which, in operation, generates channel information using the reference signal and the signal; and
a transmitter which, in operation, transmits the generated channel information;
wherein,
each resource of the resource group includes resource elements distributed over a plurality of subcarriers within an identical symbol in units of two consecutive symbols; and
the first resource and the second resource each include resource elements in mutually different resource blocks.

13. The terminal according to claim 12, wherein:
the first resource includes resource elements distributed in one of the two symbols and the other one of the two symbols of a resource block different from that of the one of the two symbols; and
the second resource includes resource elements that are of a symbol different from that of the first resource and that are distributed over one of the two symbols and the other one of the two symbols of the resource block different from that of the one of the two symbols.

14. The terminal according to claim 10, wherein the resources include different resource elements between subframes distanced by a transmission period.

15. The terminal according to claim 1, wherein the reference signal is included in a same subframe as the resource identified by the first number and the resource identified by the second number.

* * * * *